(12) United States Patent
Miyazawa

(10) Patent No.: US 11,317,015 B2
(45) Date of Patent: Apr. 26, 2022

(54) FOCUS CONTROL DEVICE AND FOCUS CONTROL METHOD THAT DETECT RANGING DATA REPRESENTING DEFOCUS AMOUNT BASED ON PHASE DIFFERENCE DETECTION SIGNALS OF A PLURALITY OF FOCUS DETECTION REGIONS

(71) Applicant: Olympus Corporation, Hachioji (JP)

(72) Inventor: Shingo Miyazawa, Hino (JP)

(73) Assignee: Olympus Corporation, Tokyo (JP)

( * ) Notice: Subject to any disclaimer, the term of this patent is extended or adjusted under 35 U.S.C. 154(b) by 260 days.

(21) Appl. No.: 16/737,867

(22) Filed: Jan. 8, 2020

(65) Prior Publication Data
US 2020/0236292 A1    Jul. 23, 2020

(30) Foreign Application Priority Data

Jan. 21, 2019 (JP) .............................. JP2019-007896

(51) Int. Cl.
| H04N 5/232 | (2006.01) |
| G02B 7/36 | (2021.01) |
| G03B 13/20 | (2021.01) |
| H04N 5/225 | (2006.01) |

(52) U.S. Cl.
CPC ......... *H04N 5/232127* (2018.08); *G02B 7/36* (2013.01); *G03B 13/20* (2013.01); *H04N 5/232121* (2018.08); *H04N 5/232122* (2018.08); *H04N 5/22525* (2018.08)

(58) Field of Classification Search
CPC ....... H04N 5/232127; H04N 5/232121; H04N 5/232122; H04N 5/22525; H04N 5/232123; G02B 7/36; G03B 13/20; G03B 13/36
See application file for complete search history.

(56) References Cited

U.S. PATENT DOCUMENTS

| 2010/0080420 A1* | 4/2010 | Abe ................. H04N 5/232127 382/106 |
| 2014/0176786 A1* | 6/2014 | Iwasaki ............ H04N 5/232133 348/351 |
| 2016/0212323 A1 | 7/2016 | Ishii |
| 2016/0295120 A1* | 10/2016 | Ota .................... H04N 5/23219 |
| 2019/0289219 A1* | 9/2019 | Yamazaki .............. H04N 5/232 |

FOREIGN PATENT DOCUMENTS

JP       2015-005853 A       1/2015

* cited by examiner

*Primary Examiner* — Gevell V Selby
(74) *Attorney, Agent, or Firm* — John C. Pokotylo; Pokotylo Patent Services

(57) ABSTRACT

A focus control device that has an image sensor that receives light flux that has passed through a photographing lens and is capable of generating a phase difference detection signal, and that executes focus adjustment based on the phase difference detection signal, the focus control device comprising a focus detection circuit that detects ranging data representing defocus amount based on phase difference detection signals of a plurality of focus detection regions that have been set in a region of the image sensor where the light flux is received, and a processor that, with ranging data corresponding to a plurality of focus detection regions being arranged in order of short distance, performs focus adjustment based on ranging data remaining after excluding ranging data in a specified range from ranging data representing a closest range.

17 Claims, 18 Drawing Sheets

FIG. 8

| RANGING RESULT | DIRECTION DETERMINATION RESULT |
|---|---|
| RANGING NOT POSSIBLE | INDETERMINATE |
| WITHIN ±1F$\delta$ | IN-FOCUS |
| LARGER THAN +1F$\delta$ | CLOSE RANGE |
| SMALLER THAN −1F$\delta$ | INFINITY |

| | 1 | 2 | 3 | 4 | 5 | 6 | 7 | 8 | 9 |
|---|---|---|---|---|---|---|---|---|---|
| ORDER OF CLOSEST RANGE | | | | | | | | | |
| RANGING VALUE (Fδ) | 14.3 | 12.3 | 10 | 2.4 | -5 | -39.8 | INVALID VALUE | INVALID VALUE | INVALID VALUE |
| AREA NO. | 5 | 8 | 1 | 4 | 2 | 6 | INVALID VALUE | INVALID VALUE | INVALID VALUE |

| | 1 | 2 | 3 | 4 | 5 | 6 | 7 | 8 | 9 |
|---|---|---|---|---|---|---|---|---|---|
| ORDER OF CLOSEST RANGE | | | | | | | | | |
| RANGING VALUE (Fδ) | 15 | 14.6 | 14.3 | 12.3 | 10 | 2.4 | -5 | -39.8 | INVALID VALUE |
| AREA NO. | 1 | 2 | 13 | 18 | 7 | 12 | 8 | 14 | INVALID VALUE |

FIG. 11

| NUMBER OF OBJECT RANGING POINTS | RANGING POINT THAT IS CANDIATE FOR ADOPTION |
|---|---|
| 9 POINTS (3X3) | SECOND AND SUBSEQUENT FROM CLOSEST RANGE |
| 25 POINTS (5X5) | FOURTH AND SUBSEQUENT FROM CLOSEST RANGE |

FIG. 12A

| ORDER OF CLOSEST RANGE | 1 | 2 | 3 | 4 | 5 | 6 | 7 | 8 | 9 |
|---|---|---|---|---|---|---|---|---|---|
| RANGING VALUE | $+3F\delta$ | INVALID VALUE | INVALID VALUE | INVALID VALUE | INVALID VALUE | INVALID VALUE | INVALID VALUE | INVALID VALUE | INVALID VALUE |

FIG. 12B

| ORDER OF CLOSEST RANGE | 1 | 2 | 3 | 4 | 5 | 6 | 7 | 8 | 9 |
|---|---|---|---|---|---|---|---|---|---|
| RANGING VALUE | $+3F\delta$ | $+2F\delta$ | INVALID VALUE | INVALID VALUE | INVALID VALUE | INVALID VALUE | INVALID VALUE | INVALID VALUE | INVALID VALUE |

FIG. 15

| | NORMAL CORRELATION DIRECTION DETERMINATION RESULT | | | | | EXTENDED CORRELATION DIRECTION DETERMINATION | OVERALL PHASE DIFFERENCE DIRECTION DETERMINATION RESULT |
|---|---|---|---|---|---|---|---|
| | CLOSE RANGE | IN-FOCUS | INFINITY | INDETERMINATE | RETAIN | | |
| A1 | O | — | — | — | — | — | CLOSE RANGE |
| A2 | | O | — | — | × | — | IN-FOCUS |
| A3 | | | — | — | O | — | RETAIN |
| A4 | | | O | — | — | CLOSE RANGE | CLOSE RANGE |
| A5 | | × | O | — | — | OTHER | INFINITY |
| A6 | × | | | O | — | CLOSE RANGE | CLOSE RANGE |
| A7 | | | × | O | — | OTHER | INDETERMINATE |
| A8 | | | | × | | CLOSE RANGE | CLOSE RANGE |
| A9 | | | | | O | OTHER | RETAIN |

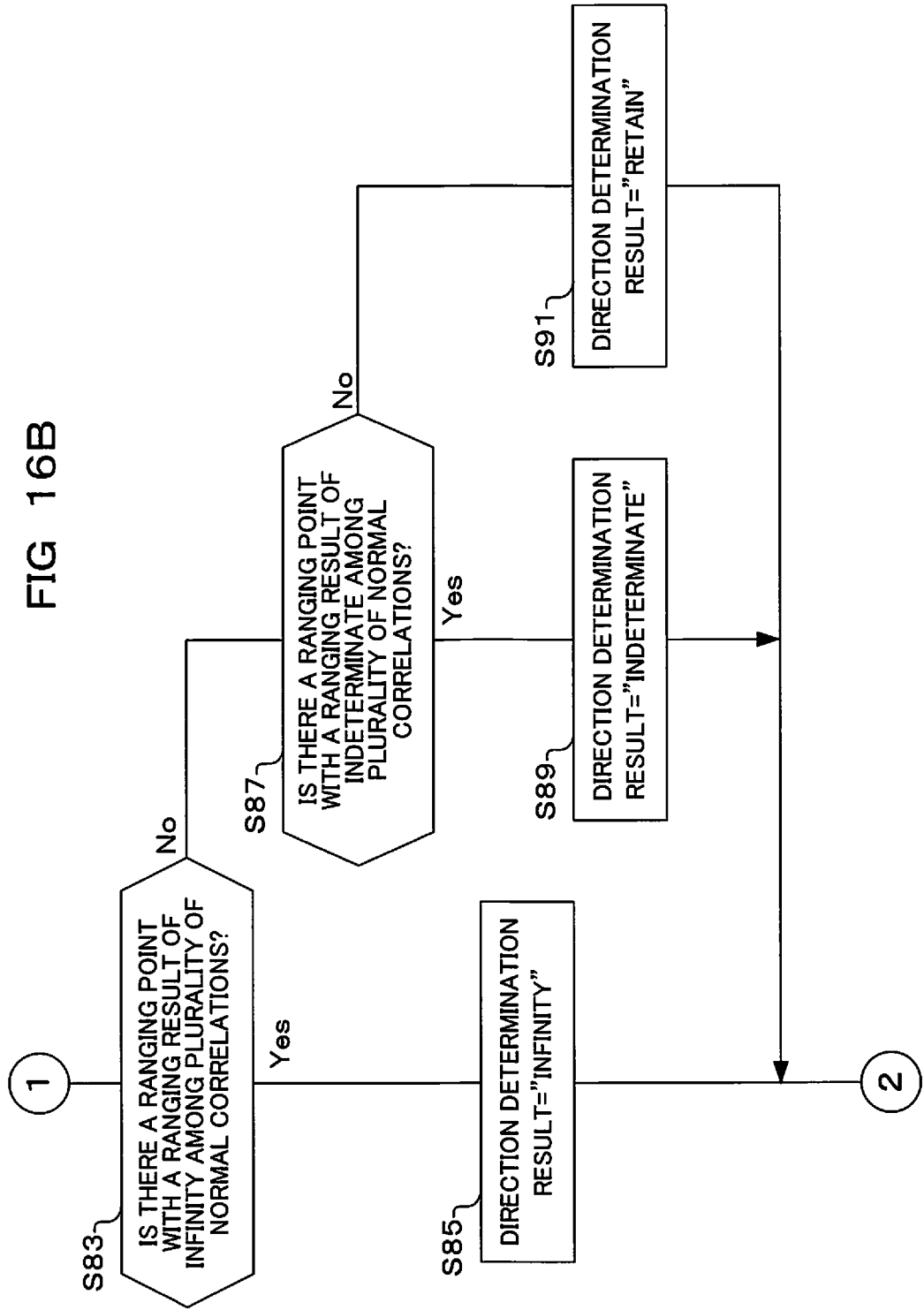

FIG. 17

|  | DIRECTION DETERMINATION RESULT || FINAL DIRECTION DETERMINATION RESULT |
|  | PHASE DIFFERENCE | CONTRAST AF | |
| --- | --- | --- | --- |
| B1 | CLOSE RANGE | — | CLOSE RANGE |
| B2 | INFINITY | — | INFINITY |
| B3 | else | CLOSE RANGE | CLOSE RANGE |
| B4 | | INFINITY | INFINITY |
| B5 | | INDETERMINATE | INDETERMINATE |

FOCUS CONTROL DEVICE AND FOCUS CONTROL METHOD THAT DETECT RANGING DATA REPRESENTING DEFOCUS AMOUNT BASED ON PHASE DIFFERENCE DETECTION SIGNALS OF A PLURALITY OF FOCUS DETECTION REGIONS

CROSS-REFERENCE TO RELATED APPLICATIONS

Benefit is claimed, under 35 U.S.C. § 119, to the filing date of prior Japanese Patent Application No. 2019-007896 filed on Jan. 21, 2019. This application is expressly incorporated herein by reference. The scope of the present invention is not limited to any requirements of the specific embodiments described in the application.

BACKGROUND OF THE INVENTION

1. Field of the Invention

The present invention relates to a focus control device that is provided with a phase difference detection system focus detection device, and to a focus control method.

2. Description of the Related Art

Since a plurality of subjects exist within a photographing screen, then even if there is a subject that is a mix of near and far objects it is desirable to focus on a main subject within that. There have therefore been various proposals to divide a focus detection region within the photographing screen into a plurality of regions, perform focus detection in respective focus detection regions, and perform focusing based on a plurality of focus detection results. For example, Japanese patent laid-open No. 2016-133674 (hereafter referred to as "patent publication 1") discloses a focus control device in which there is division into a plurality of focus detection areas, an average value of defocus amount for each area is calculated, and focusing of a photographing lens is performed using this value.

The focus control device disclosed in patent publication 1 is a case where it is not possible to perform optimum focusing on a main subject because defocus amount of each area is averaged. Generally, it is often the case that the subject at the closest range is a main subject, and in this case a subject that is not the intended subject of the photographer is focused on. If focus is performed using defocus amount indicating the closest range in order to deal with this, in the event that an error is included in that closest range defocus amount, a problem arises in that focus precision is lowered.

SUMMARY OF THE INVENTION

The present invention provides a focus control device and focus control method that can appropriately perform focusing on a main subject.

A focus control device of a first aspect of the present invention has an image sensor that is capable of receiving light flux that has passed through a photographing lens to generate a phase difference detection signal, and executes focus adjustment based on the phase difference detection signal, and comprises a focus detection circuit that detects ranging data representing defocus amount based on phase difference detection signals of a plurality of focus detection regions that have been set in a region of the image sensor where the light flux is received, and a processor that, arranges ranging data corresponding to a plurality of focus detection regions in order of distance from the closest and performs focus adjustment based on ranging data remaining after excluding ranging data in a specified range from ranging data representing a closest range.

A focus control method of a second aspect of the present invention is a focus control method for a focus control device that has an image sensor capable of generating a phase difference detection signal by receiving light flux that has passed through a photographing lens, and executes focus adjustment based on the phase difference detection signal, the focus control method comprising detecting ranging data representing defocus amount based on phase difference detection signals of a plurality of focus detection regions that have been set in a region of the image sensor where the light flux is received, and, with ranging data corresponding to a plurality of focus detection regions being arranged in order of short distance, performs focus adjustment based on ranging data remaining after excluding ranging data in a specified range from ranging data representing a closest range.

A non-transitory computer-readable medium storing a processor executable code of a third aspect of the present invention, which when executed by at least one processor, performs a focus adjustment method, the processor being arranged within a focus control device that has an image sensor capable of generating a phase difference detection signal by receiving light flux that has passed through a photographing lens, and executes focus adjustment based on the phase difference detection signal, the focus adjustment method comprising detecting ranging data representing defocus amount based on phase difference detection signals of a plurality of focus detection regions that have been set in a region of the image sensor where the light flux is received, and, with ranging data corresponding to a plurality of focus detection regions being arranged in order of short distance, performing focus adjustment based on ranging data remaining after excluding ranging data in a specified range from ranging data representing a closest range.

BRIEF DESCRIPTION OF THE DRAWINGS

FIG. 8 is a table showing determination of indeterminate, infinity, in-focus, and close range based on ranging result, in the camera of one embodiment of the present invention.

FIG. 11 is a table describing selection processing using number of ranging points, in the camera of one embodiment of the present invention.

FIG. 12A and FIG. 12B are tables describing the fact that ranging points where ranging is not possible are taken into consideration, in the camera of one embodiment of the present invention.

FIG. 15 is a table showing determination of infinity, in-focus, close range, indeterminate, and retain based on ranging result for normal correlation and extended correlation, in the camera of one embodiment of the present invention.

FIG. 16A and FIG. 16B are flowcharts showing operation of phase difference direction determination, in the camera of one embodiment of the present invention.

FIG. 17 is a table describing hybrid direction determination, in the camera of one embodiment of the present invention.

DETAILED DESCRIPTION OF THE PREFERRED EMBODIMENTS

An example where the present invention is adopted in a digital camera (referred to as a "camera") as one embodiment of the present invention will be described in the following. This camera has an image sensor, with a subject image being converted to an image signal by image pixels of this image sensor, and the subject image being displayed as a live view image on a display section arranged on the rear surface of the camera body or within a viewfinder based on this converted image signal. A photographer determines composition and photo opportunity by looking at the live view display. If a release button is operated, image data is stored in a storage medium. Image data that has been stored in the storage medium can be subjected to playback display on the display section if playback mode is selected.

Also, phase difference detection pixels are arranged on the image plane of the image sensor. These phase difference detection pixels are pixels for performing focus detection using so-called phase difference AF, and output phase difference detection signals. There are a plurality of phase difference ranging points within a focus detection area, and ranging points, among these ranging points, that output a ranging result that has been stable in time series (retained ranging points) are determined. A focus lens is moved to an in-focus position based on a ranging result, among ranging results (defocus amount) of these ranging points that have been determined, that is at a specified rank from the closest range (refer to S41 in FIG. 7, and to FIG. 10). In this way, the camera of this embodiment has an image sensor that is capable of receiving light flux that has passed through a photographing lens to generate a phase difference detection signal, and can execute focus adjustment based on the phase difference detection signal.

Figure 1:
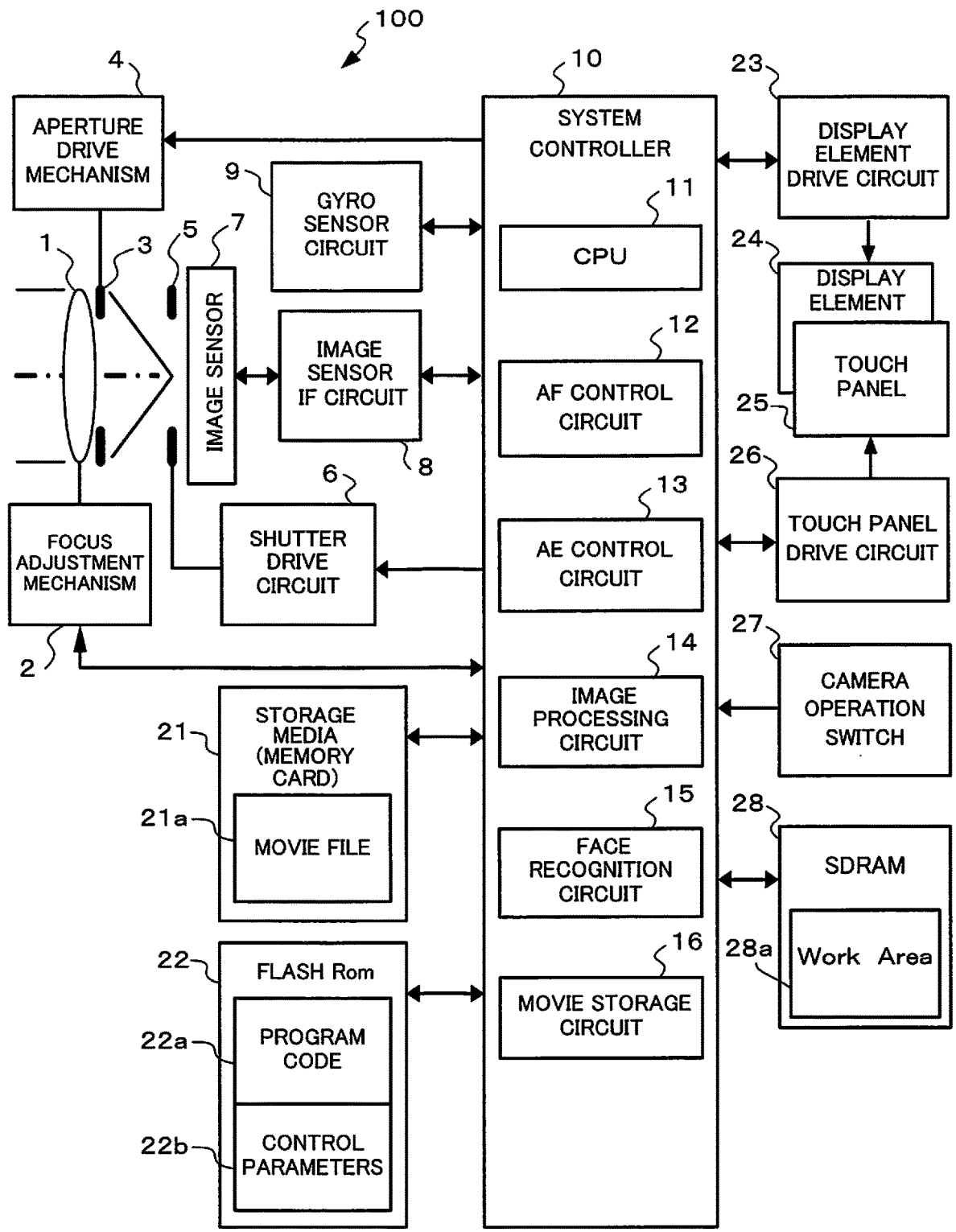
FIG. 1 is a block diagram mainly showing the electrical structure of a camera of one embodiment of the present invention.

FIG. 1 is a block diagram mainly showing the electrical structure of a camera 100 of this embodiment. A photographing lens 1 is comprised of a plurality of optical lenses including a focus lens, and forms a subject image. The photographing lens 1 may also have a zoom lens for changing focal length. The focus lens is capable of moving in the optical axis direction using a focusing mechanism 2. The focusing mechanism 2 includes a lens drive motor, a lens drive mechanism, and a lens drive circuit etc., and moves the focus lens to perform focusing based on control signals from a system controller 10.

An aperture 3 is arranged on the optical axis of the photographing lens 1, and has opening diameter changed by an aperture drive mechanism 4. By changing the opening diameter of the aperture 3, it is possible to change amount of light flux that passes through the photographing lens 1. The aperture drive mechanism 4 includes an aperture drive motor (or actuator), aperture drive mechanism, aperture drive circuit etc., and performs control of an aperture value based on control signals from the system controller 10.

A shutter 5 is arranged on the optical axis of the photographing lens 1, and opening and closing of the shutter is performed using a shutter drive circuit 6. Specifically, if the shutter 5 is closed subject light flux to the image sensor 7 is shut off, while if the shutter 5 is open subject light flux is guided to the image sensor 7. When performing live view display and movie shooting, the shutter 5 is set to open. Also, when performing still picture shooting, after a shutter has been temporarily closed, it is opened for an exposure time corresponding to shutter speed, and once the exposure time has elapsed the shutter 5 is closed. The shutter drive circuit 6 performs opening and closing control of the shutter 5 based on control signals from the system controller 10.

The image sensor 7 is a CCD (Charge Coupled Device) or CMOS (Complementary Metal-Oxide-Semiconductor) image sensor etc. The image sensor 7 has a pixel section with image pixels and phase difference detection pixels arranged two-dimensionally. Image pixels subject a subject image that has been formed by the photographing lens 1 to photoelectric conversion using photodiodes, and generate a photoelectric conversion signal. An image signal is output based on this photoelectric conversion signal, and image processing for live view display or for image storage is executed. A contrast value (focus evaluation value) is also calculated using the image signal, and focus adjustment of the photographing lens is performed based on this contrast value.

Also, phase difference detection pixels respectively subject light flux that has passed through different regions of an imaging lens 1 to photoelectric conversion using photodiodes, to generate a photoelectric conversion signal for phase difference detection. Within light flux that has passed through the photographing lens, the phase difference detection pixels only receive light flux from one specified direction among a right direction and left direction (or top direction and bottom direction etc.), and by calculating a phase difference between signals based on light flux of one direction and another direction it is possible to obtain a defocus amount for the photographing lens. The image sensor 7 functions as an image sensor that is capable of generating a phase difference detection signal by receiving light flux that has passed through a photographing lens.

It should be noted that although the phase difference detection pixels on the image pixels may be constructed separately, a phase difference detection signal and an image signal may be acquired from a single pixel serving as both types of pixel. Specifically, a single pixel section is constructed by arranging a single microlens and two photodiodes for this microlens, and output of one of the photodiodes is made output of phase difference detection pixels, while output of both photodiodes may be made output for an image pixel (refer, for example, Japanese patent laid-open No. 2015-005853).

All or part of a focus detection area for phase difference AF within a photographing range is divided into a plurality of areas, and defocus amount (also including defocus direction) is calculated for each of the respective individual area (an individual area may also be called a "focus detection region"). For contrast AF also, a focus detection area is similarly divided into individual areas, and contrast is calculated for each of the respective individual areas. The individual areas will be described later using FIG. 2A and FIG. 2B.

Also, with this embodiment, as was described previously, contrast AF is performed based on output of an image signal from image pixels, and phase difference AF is performed based on a phase difference detection signal from phase difference detection pixels. Specifically, with this embodiment, focus adjustment is performed by combining ranging results from contrast AF performed using an image signal, and ranging results from phase difference AF performed using a phase difference detection signal.

The image sensor 7 performs accumulation and readout operations of the photoelectric conversion signal using an image sensor IF (interface) circuit 8. The image sensor IF circuit 8 executes imaging control of the image sensor 7 based on control signals from the system controller 10, subjects a photoelectric conversion signal that has been read out to AD conversion, and outputs this photoelectric conversion signal that has been subjected to AD conversion to the system controller 10.

A gyro sensor circuit 9 has gyro sensors for detecting inclination of the camera 100, and vibrations applied to the camera 100. The gyro sensor circuit 9 subjects detection signals from the gyro sensors to AD conversion, and then outputs converted signals to the system controller 10. When movie AF is being performed, when change in conditions of the camera 100 has been detected based on detection signals from the gyro sensor circuit 9, there is a transition to a control phase (refer to FIG. 3). Also, the image sensor 7 or the photographing lens 1 are driven based on detection signals of the gyro sensor circuit 9 so as to reduce camera shake of the camera 100.

The system controller 10 comprises a CPU (Central Processing Unit) 11, AF (Auto Focus) control circuit 12, AE (Auto Exposure) control circuit 13, image processing circuit 14, facial recognition circuit 15 and movie storage circuit 16. The system controller may be constructed integrally as a processor having an ASIC (Application Specific Integrated Circuit), and may be constructed using a plurality of processors.

The CPU 11 is a processor for control, and performs control of each section and each circuit within the camera 100, and performs overall control of the camera, based on program code that has been stored in the flash ROM 22.

Figure 7:
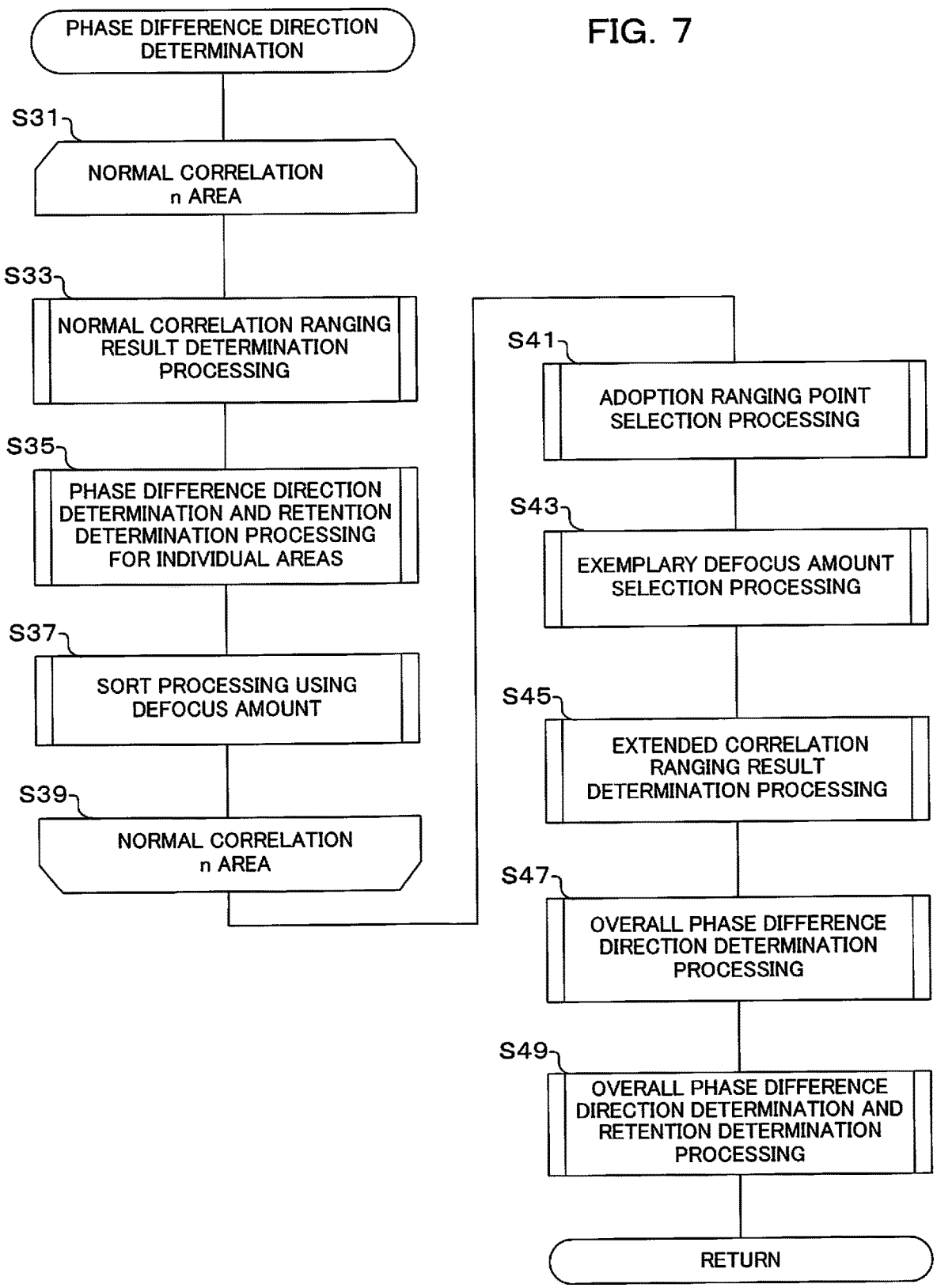
FIG. 7 is a flowchart showing operation of phase difference direction determination, in the camera of one embodiment of the present invention.
Figure 10:
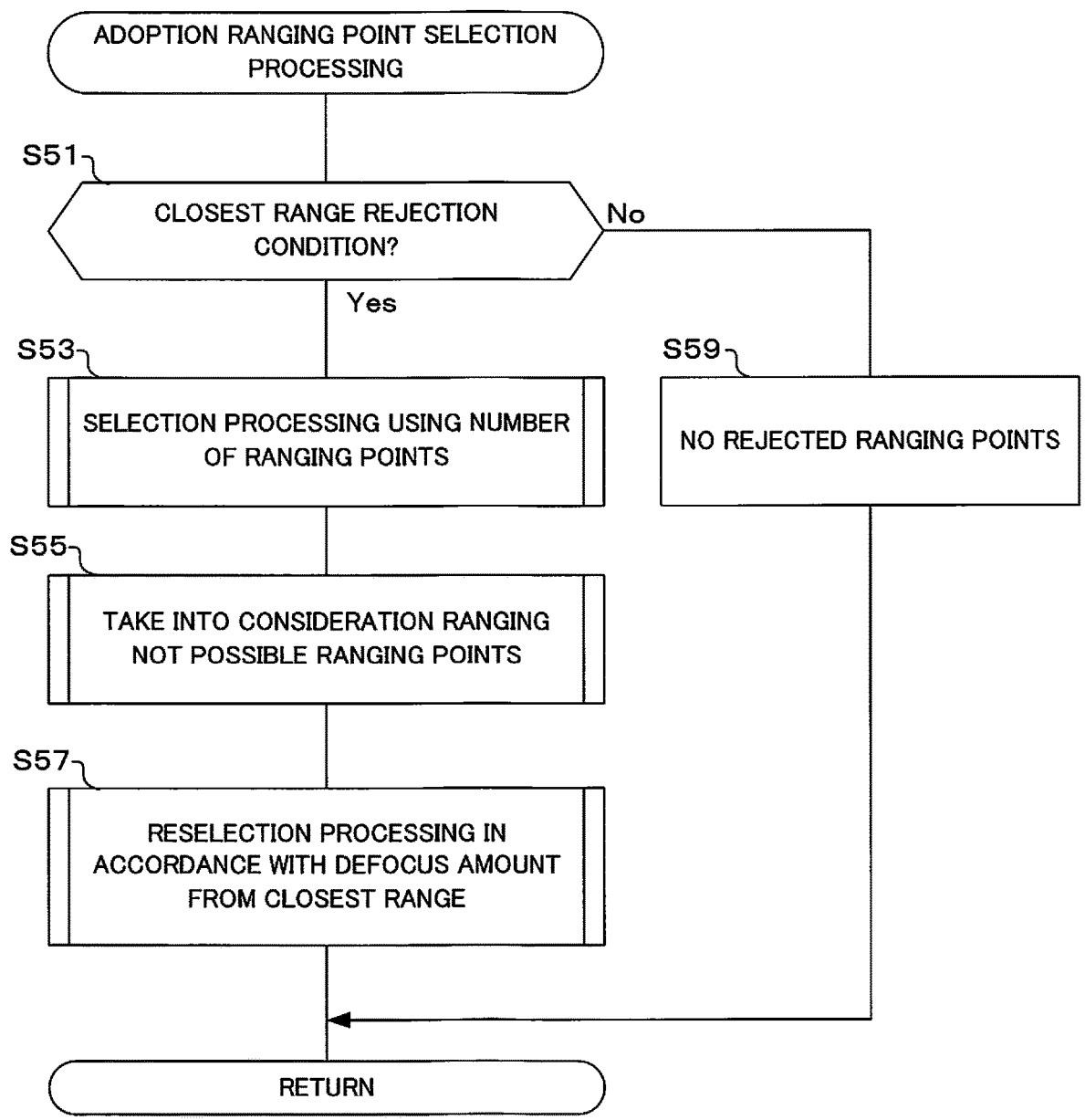
FIG. 10 is a flowchart showing operation for adopted ranging point selection processing, in the camera of one embodiment of the present invention.

The CPU 11 functions as a processor (control section) that, with ranging data corresponding to a plurality of focus detection regions being arranged in order of short distance, performs focus adjustment based on ranging data remaining after excluding ranging data in a specified range from ranging data representing a closest range (refer, for example, to S37 and S41 in FIG. 7, and to FIG. 10). The processor (control section) sets a number of ranging data or a specified defocus amount range as a specified range, based on number or size of the focus detection regions (refer, for example, to S53 and S57 in FIG. 10, and to FIG. 11). The processor (control section) detects ranging data in time series for every focus detection region and evaluates stability of a plurality of raging data by detecting, and with ranging data of focus detection regions that have been evaluated as being stable arranged in order of short distance, performs focus adjustment based on ranging data remaining after excluding ranging data in a specified range from ranging data representing a closest range (refer, for example, to S51 in FIG. 10). The processor (control section) performs focus adjustment based on ranging data indicating the closest range, among the remaining ranging data (refer, for example, to S43 in FIG. 7). The processor (control section) performs focus adjustment based on ranging data that is a specified number away from the closest range, among the remaining ranging data, in accordance with number or size of the plurality of focus detection regions (refer, for example, to S53 in FIG. 10, and to FIG. 11).

The processor (control section), in the event that ranging data has been evaluated in time series as not being stable, does not exclude ranging data within a specified range from ranging data indicating the closest range from among ranging data corresponding to the plurality of focus detection regions, and selects ranging data used in focus detection from among all ranging data (refer, for example, to S51 No and S59 in FIG. 10). The processor (control section) performs focus adjustment based on ranging data within a specified range from ranging data indicating the closest range, in the event that remaining ranging data is ranging not possible, of ranging data corresponding to a plurality of focus detection regions (refer, for example, to S55 and S57 in FIG. 10, and to FIG. 12 and FIG. 13A to FIG. 13C).

In the event that, in ranging data corresponding to a plurality of focus detection regions, a plurality of focus detection regions corresponding to ranging data within a specified range are adjacent, the processor (control section) performs focus adjustment based on ranging data of the plurality of adjacent focus detection regions. In the event that a specified range is made a specified number, the processor (control section), determines whether or not ranging data that has been detected by the focus detection circuit (focus detection section) is valid for each of the focus detection regions, and if, among ranging data that has been determined to be valid, a number of ranging data within a specified range from ranging data indicating the closest range is less than a specified number, selects from ranging data within the specified range (refer, for example, to S55 in FIG. 10, and to FIG. 12A, and FIG. 12B). In the event that the specified range is made a specified number, if a difference between defocus amount at the closest range and defocus amount of ranging data indicating closest range, among remaining ranging data, is larger than a specified threshold value, the processor (control section) performs focus adjustment based on the closest range ranging data, among remaining ranging data (refer, for example, to S57 in FIG. 10, and to FIG. 13A to FIG. 13C, and FIG. 4).

The AF control circuit 12 performs calculation of defocus amount for the photographing lens 1 (phase difference AF), based on phase difference detection signals from phase difference detection pixels within the image sensor 7. Focus adjustment of the photographing lens 1 is performed based on the defocus amount that has been calculated. Also, the AF control circuit 12 performs focus adjustment of the photographing lens 1 based on a contrast value (focus evaluation value) for image signals from the image pixels within the image sensor 7 (contrast AF). Some functions of the AF control circuit 12 may also be executed by the CPU 11, and AF control may also be performed by cooperation between the CPU 11 and the AF control circuit 12.

The AF control circuit 12 functions as a focus detection circuit (focus detection section) that detects ranging data representing defocus amount based on phase difference detection signals of a plurality of focus detection regions that have been set in a region of the image sensor where the light flux is received.

The AE control circuit 13 calculates subject brightness based on a photoelectric conversion signal from the image sensor 7, and calculates exposure control values such as aperture value, shutter speed value and ISO sensitivity to give appropriate exposure, based on this subject brightness. Also, control of the aperture 3, shutter 5, and electronic shutter speed and ISO sensitivity etc. of the image sensor 7, may also be performed based on exposure control values that have been calculated. Some functions of the AE control circuit 13 may also be executed by the CPU 11, and AE control may also be performed by cooperation between the CPU 11 and the AE control circuit 13.

The image processing circuit 14 generates image data from a signal that has been read out from the image sensor 7, and applies various image processing such as exposure correction and noise processing, WB gain correction, edge enhancement, false color correction etc. to this image data that has been generated. Further, the image processing circuit 14 also performs processing (development processing) to convert image data that has been subjected to the above described image processing to a stored data format etc. The image processing circuit 14 is also capable of detecting motion vectors of a subject based on image data of continuous frames.

The facial recognition circuit 15 determines whether or not a face of a person is contained within the subject, based on image data from the image sensor 7. If the result of this determination is that a face is contained, the facial recognition circuit 15 obtains size and position etc. of the face. In a case where movie shooting mode has been set, the movie storage circuit 16 converts image data that has been processed by the image processing circuit 14 to a movie file for movie storage, and stores this movie file 21a that has been converted in storage media 21.

The storage media 21 is an electrically rewritable non-volatile memory, and can be loaded into the body of the camera 100, like a memory card. It should be noted that the storage media 21 may also be storage medium that is fixed to the body of the camera 100, such as a hard disk. Movie files 21a can be stored in the storage media 21. It should be noted that besides movie files 21a, image files for still pictures can also be stored in the storage media 21

Flash ROM 22 is an electrically rewritable non-volatile memory. Program code 22a and control parameters 22b are stored in the flash ROM 22. The CPU 11 performs overall control of the camera 100 in accordance with program code 22a. The control parameters 22b are various adjustment values etc. for controlling the camera 100.

Display elements 24 are a liquid crystal display and organic EL etc., and are arranged on the rear surface of the camera 100 and within an electronic viewfinder. Live view display and playback display of image data that has been stored in the storage media 21, or menu screens etc., are displayed on the display elements 24. A display element drive circuit 23 causes display of images on a display element 24 based on signals from the system controller 10. A touch panel 25 detects touch operations by a user on a display element 24, in the event that a display element 24 is arranged on the exterior of the camera 100. A touch panel drive circuit 26 detects touch operations, and outputs detection results to the system controller 10.

The camera operation switch 27 is an interface for inputting user operations to the camera 100. The camera operation switch 27 has various operation members, such as a power switch, release button, movie button, mode setting dial etc. As will be described later (refer to S35 in FIG. 7), a counter threshold value TH for direction determination retention can be set manually by operating the camera operation switch 27. The camera operation switch 27 functions as an operation input section.

An SDRAM (Synchronous Dynamic Random Access Memory) 28 is a memory for temporary storage of image data. There is a work area 28a for temporary storage of image data for processing, in the CPU 11 and each circuit within the system controller 10.

Figure 2A:
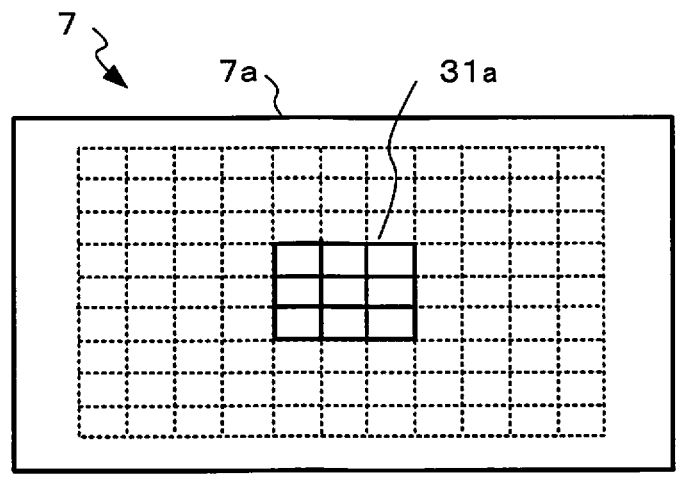
FIG. 2A and FIG. 2B are drawings showing arrangement of focus detection areas of an image plane of a camera of one embodiment of the present invention.

Next, the focus detection areas of this embodiment will be described using FIG. 2A and FIG. 2B. Pixel sections are arranged two-dimensionally on the image plane of the image sensor 7, as was described previously. An individual area is formed using the plurality of pixel sections, and a focus detection area is constructed using a collection of the plurality of individual areas. In FIG. 2A, an example is shown where a focus detection area 31a has been divided into nine individual areas, arranged 3×3. Also, in FIG. 2B an example is shown where a focus detection area 31b is divided into 25 individual areas, arranged 5×5. It should be noted that the focus detection area 31a and 31b will be described as a focus detection area 31 when considered together.

Figure 2B:
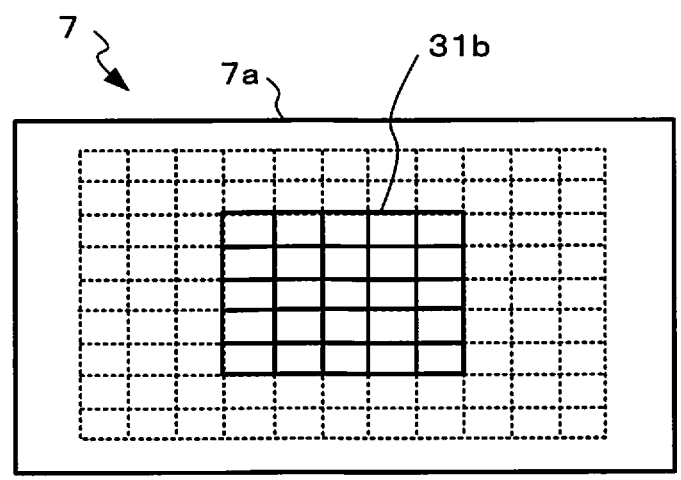

As shown in FIG. 2A and FIG. 2B, the focus detection areas 31a and 31b are set in part of a central portion of a shooting range 7a, but the arrangement is not limited to the example shown in FIG. 2A and FIG. 2B and the focus detection areas may be at other positions. The number of divisions of the focus detection areas 31a and 31b is not limited to the example shown in FIG. 2A and FIG. 2B and there may be another number of divisions, and the number of divisions may be different in the horizontal and vertical directions. It should be noted that in extended correlation calculation (S45 in FIG. 7), which will be described later, a region that is wider in the horizontal direction or vertical direction than the focus detection areas shows in FIG. 2A and FIG. 2B is subjected to correlation calculation as a single focus detection area (also called an extended correlation area).

Next, movie AF of this embodiment will be described using FIG. 3. Movie AF is processing to continuously perform focus adjustment so as to focus on a subject at the time of movie shooting. It should be noted that it is also possible to perform image display with high focus tracking at the time of live view display, if movie AF is executed.

Figure 3:
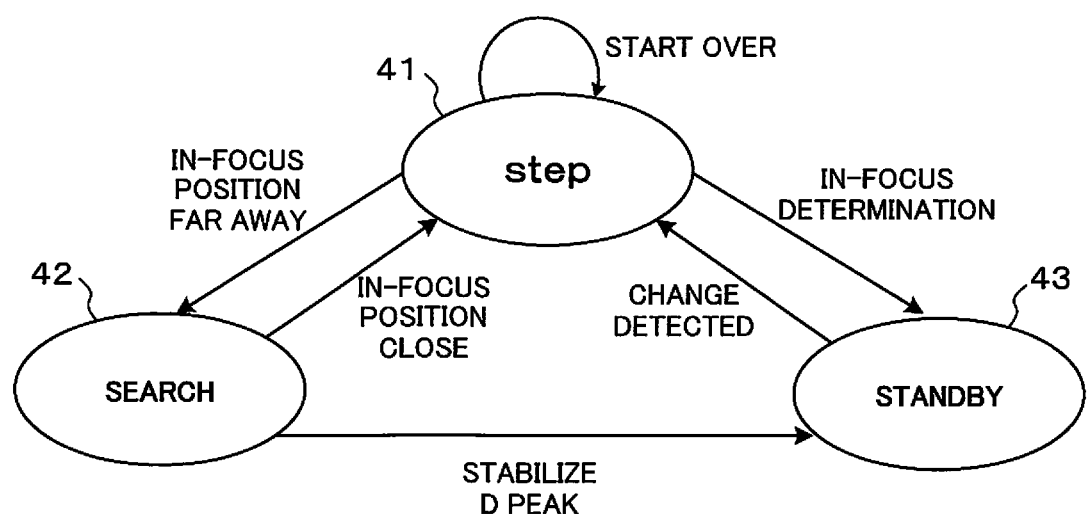
FIG. 3 is a drawing showing transitions of a control phase at the time of movie AF, with the camera of one embodiment of the present invention.

As shown in FIG. 3, with movie AF of this embodiment, processing state transitions between three control phases, which are a step phase 41, a search phase 42, and a standby phase 43. In the step phase 41, the focus lens is driven to an in-focus position using a combination of relative drive of the focus lens by minuscule amounts in either a close-up direction or an infinity direction (first direction), and relative drive of the focus lens by minuscule amounts in a direction that is opposite to the first direction (second direction). Relative drive of the focus lens by minuscule amounts in a given direction in this manner is called step drive. Details of the step phase will be described later (refer to FIG. 4). In the search phase 42, ranging is performed while continuously driving the focus lens in either the close-up direction or the infinity direction, and the focus lens is driven to the in-focus position. In the standby phase 43 there is a standby state where the focus lens is not driven and only ranging is repeatedly performed.

In the step phase 41, when it has been determined that the position of the focus lens is far from in-focus position the control phase transitions to the search phase 42. As a result of the transition to the search phase 42, the focus lens is rapidly moved to the vicinity of an in-focus position. On the other hand, when it has been determined in the step phase 41 that the focus lens position is at an in-focus position (in-focus determination), the control phase transitions to the standby phase 43, and lens drive is stopped. Also, when it is been determined in the step phase 41 that the focus lens has reached an end position, the control phase transitions to the standby phase 43, and lens drive is stopped.

When it has been determined in the search phase 42 that the lens position is in the vicinity of an in-focus position (close to in-focus position), the control phase transitions to the step phase 41. After this, the focus lens is moved to the in-focus position by step drive. On the other hand, when it has been determined in the search phase 42 that the lens position is in a steady state (steady contrast peak) at the in-focus position, the control phase transitions to the standby phase 43 and lens drive is stopped.

In the standby phase 43, when there has been detection of movement of the camera 100 (change in attitude), or there has been change in contrast of an image that has been acquired, change in face recognition information etc., namely when change in condition of the camera 100 or subject has been detected (change detection), the control phase transitions to the step phase 41. At this time, step drive is commenced so as to put the focus lens in a focused state.

Next, operation of the step phase 41 will be described using the flowchart shown in FIG. 4. Processing related to this flowchart shown in FIG. 4 (this also includes FIG. 5, FIG. 7, FIG. 10, FIG. 14, FIG. 16A, FIG. 16B, FIG. 18 and FIG. 19) is implemented by the CPU 11 controlling each circuit etc. within the camera 100 based on program code 22a.

Figure 4:
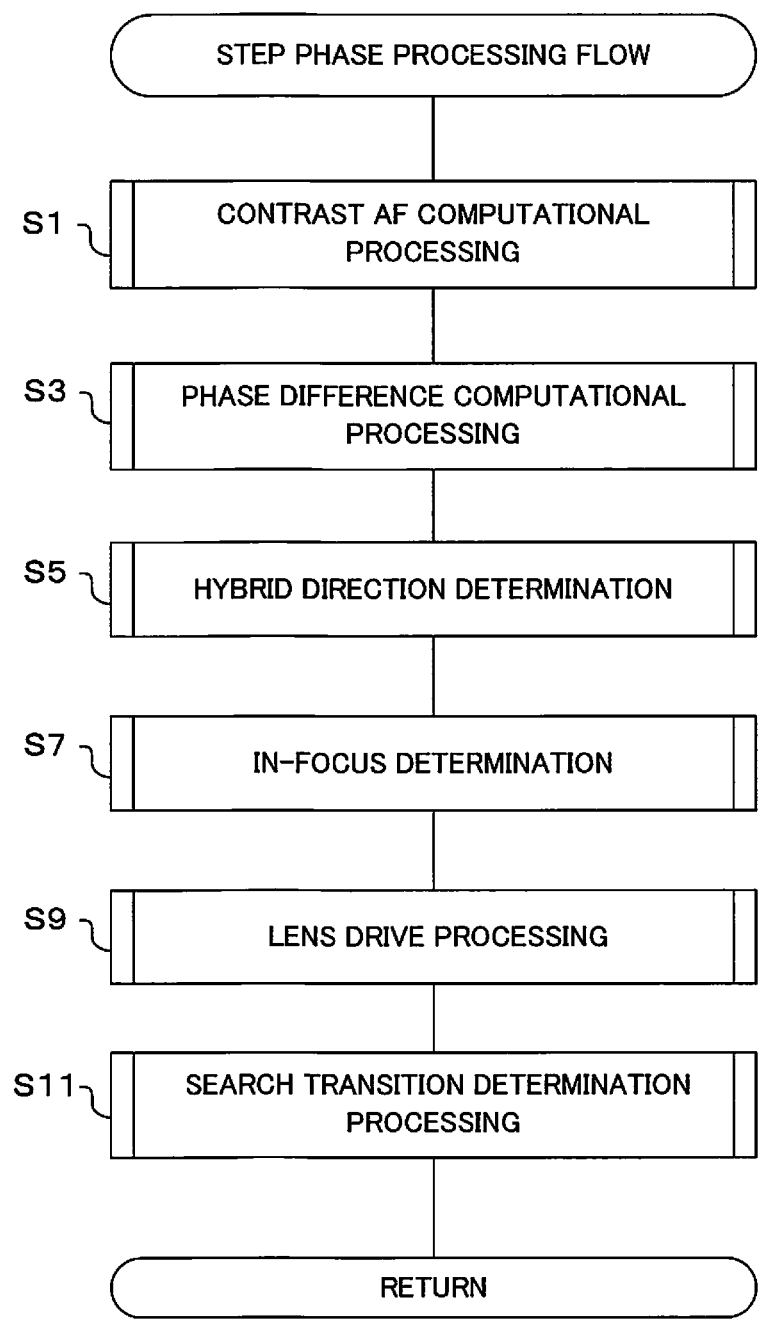
FIG. 4 is a flowchart showing operation of step phase processing, in the camera of one embodiment of the present invention.

If the flow for step phase processing shown in FIG. 4 is commenced, first, contrast AF computational processing is performed (S1). In this step, drive direction of the photographing lens 1 is determined using contrast AF. Specifically, the AF control circuit 12 calculates contrast value (focus evaluation value) using signals from the image pixels of the image sensor 7. When the photographing lens 1 has moved in one direction, it is determined whether contrast value has increased or decreased. Lens drive direction to increase contrast value is obtained based on the result of this determination.

If contrast AF computational processing has been performed, next, phase difference computational processing is performed (S3). In this step, phase difference information (defocus amount and defocus direction) is calculated by phase difference AF using signals from phase difference detection pixels of the image sensor 7, and based on this information whether direction in which a subject will become in focus is close range, infinity, indeterminate, retain, or if there is a focused state, is obtained. It should be noted that direction in which a subject will become in focus is close range (focus lens is moved toward close-up end, toward the close-range side) or infinity (focus lens is moved toward infinity end, toward the long distance side), but a state where direction to achieve focus cannot be detected is described as "indeterminate", and a state where detection is in progress is described as "retain". Also, a state where the subject is in focus and the direction does not exist is included in "in-focus". Also, a direction in which a subject will become in focus is obtained, and a result that has been determined is called direction determination result. Detailed operation of this phase difference computational processing will be described later using FIG. 5.

If phase difference computational processing has been performed, next, hybrid direction determination is performed (S5). In this step, overall direction determination is performed using a direction determination result from contrast AF that was performed in step S1, and a direction determination from phase difference information that was obtained in step S3. Specifically, in the step phase 41, at the time of determination of movement direction of the focus lens, determination is performed comprehensively using a direction determination result from contrast AF and a direction determination result from phase difference information. Detailed operation of the hybrid direction determination will be described later using FIG. 17.

If hybrid direction determination has been performed, next, in-focus determination is performed (S7). In this step, determination as to whether or not the subject is in focus is performed using either of in-focus determination using contrast AF and in-focus determination using phase difference AF. If in-focus has been determined, there is a transition to the standby phase 43 for the next frame, while if in-focus has not been determined the step phase 41 continues (refer to FIG. 3). Detailed operation of this in-focus determination will be described later using FIG. 18.

Once the in-focus determination has been performed, lens drive processing is next performed (S9). In this step, lens drive processing is performed in accordance with a result of phase difference computational processing in step S3, and a result of hybrid direction determination in step S5. Detailed operation of this lens drive processing will be described later using FIG. 19.

Once the lens drive processing has been performed, search transition determination processing is next performed (S11). In this step it is determined whether, in the next frame, there will be transition to the search phase 42 or the step phase 41 will continue (refer to FIG. 3). Once the search transition determination processing has been performed, the originating main flow is returned to. If the step phase 41 continues in the next frame, processing from step S1 is performed.

In this way, in the flow for the step phase processing, when the step phase 41 is being performed at the time of movie AF (refer to FIG. 3), determination of drive direction is performed using ranging results from contrast AF and phase difference AF. Since determination is performed comprehensively using both contrast AF and phase difference AF, it is possible to reliably perform focus control even if a subject is in various states.

Figure 5:
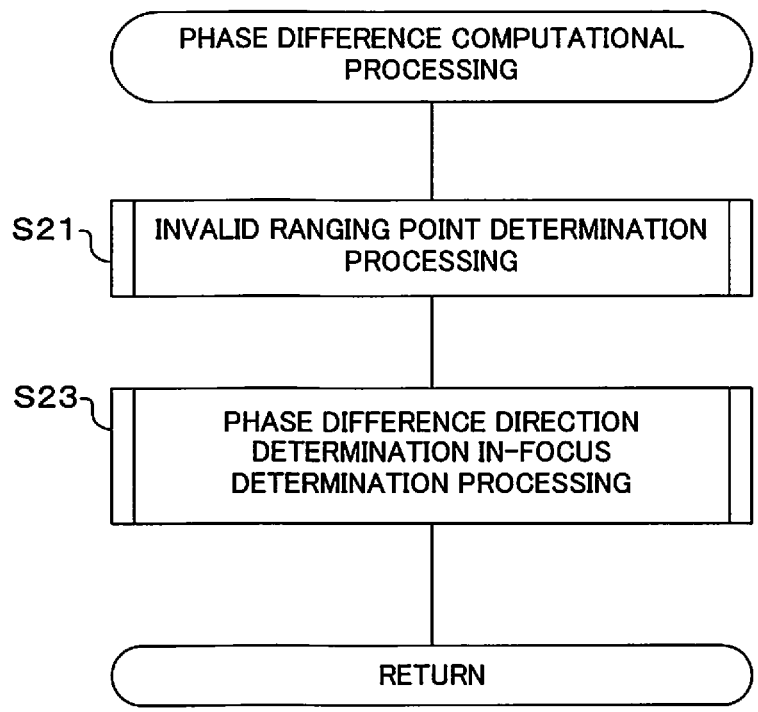
FIG. 5 is a flowchart showing operation of phase difference computational processing, in the camera of one embodiment of the present invention.

Next, operation of the phase difference computational processing in step S3 will be described using the flowchart shown in FIG. 5. If the flow for phase difference computational processing is commenced, first, determination processing as to whether or not there are invalid ranging points is performed (S21). In this step, ranging data having low reliability is made invalid for every individual area within the focus detection area 31. Determination of reliability may utilize a known method when performing phase difference AF. Individual focus detection areas within the focus detection area 31 that have been determined as invalid are removed at the time of phase difference direction determination that is performed in the next step S23.

If invalid ranging point determination processing has been performed, next, phase difference direction determination and in-focus determination processing is performed (S23). In this step, direction determination using phase difference AF and in-focus determination processing are performed using correlation results based on signals from individual areas within the focus detection area 31. As was described previously, there are 5 types of direction determination result, namely "close range", "infinity", "in-focus", "indeterminate" and "retain". Detailed operation of this phase difference direction determination processing will be described later using FIG. 7.

In this way, in the flow for phase difference computational processing, determination of direction for driving the focus lens and focused state is performed based on phase difference ranging results (refer to S23). The result of this determination is used in drive direction determination for focus lens drive using step drive in the step phase 41 (refer to S5 in FIG. 4).

Next, the phase difference direction determination processing of step S23 (refer to FIG. 5) will be described. This phase difference direction determination determines five types, namely close range, infinity, in-focus, indeterminate, or retain, in accordance with ranging results. Also, when performing phase difference direction determination, direction determination is performed based on ranging results for a plurality of normal correlations, and extended correlations.

Figure 6:
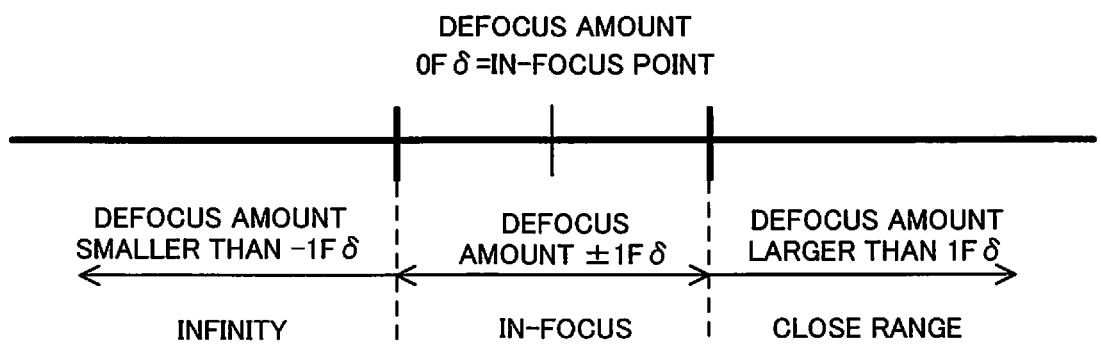
FIG. 6 is a drawing showing determination of infinity, in focus, and close range based on defocus amount, in the camera of one embodiment of the present invention.

First, determination of infinity, in focus, and close range, that are performed based on defocus amount for phase difference AF, will be described using FIG. 6. In the case where defocus amount that has been calculated using phase difference AF is "0Fδ", it is determined to be at a focus point. Here, F is aperture value, and δ is a numerical value determined by pixel pitch of the image sensor 7. In any event, since there is multiplication by "0", 0Fδ becomes 0. If defocus amount is in a range of ±1Fδ, with focus point (0Fδ) as a center, "in focus" is determined. Then, if defocus amount is smaller than −1Fδ "infinity" is determined, while if defocus amount is larger than +1Fδ "close range" is determined.

Next, operation of the phase difference direction determination (processing) will be described using the flowchart shown in FIG. 7. If the flow for phase difference direction determination processing is commenced, then processing using normal correlation is performed for each individual area of the focus detection area 31, in steps S31 to S39. First, an area n in which normal correlation is performed is set (S31). With the example shown in FIG. 2A, inside the focus detection area 31*a* is divided into nine areas. In this case, position n of each area is made 1 to 9, and area position is sequentially changed each time the processing of steps S31 to S37 is completed. With the example shown in FIG. 2B, inside the focus detection area 31*b* is divided into 25 areas. In this case, position n of each area is made 1 to 25, and area position is sequentially changed each time the processing of steps S31 to S37 is completed.

Once area position in which normal correlation will be performed has been set, next, determination processing for ranging results from normal correlation calculation is performed (S33). In this step, defocus amount is calculated using phase difference AF for areas that have been set within the focus detection area 31, and direction determination is performed in accordance with this computation result. As shown in FIG. 8, a result of this direction determination is one of the four determinations such as "indeterminate", "in focus", "close range", or "infinity". Indeterminate is set in a case where ranging using phase difference AF is not possible, and defocus amount cannot be calculated. In a case where the determination is not "indeterminate", determination is one of "in focus", "close range", or "infinity", as was described using FIG. 6, in accordance with whether defocus amount was within or outside ±1Fδ.

Next, phase difference direction determination and retention determination processing individual areas is performed (S35). In this step, when direction determination result of step S33, in individual areas within the focus detection area 31 is the same as previously, counting up is performed by updating a counter value, while if the direction determination results is different from previously the counter is set to 0. Then, if a counter value of this counter exceeds a threshold value TH, the direction determination result for this time is updated as a direction determination result for that area (ranging point). With unstable conditions, such as when a subject is moving, or with a subject for which phase difference detection is difficult (for example, a periodicity-containing subject etc.) there is a possibility of ranging results of individual areas that have been finely divided being erroneous, resulting in instability. Therefore, if it is not a case where direction determination results are stable, focus adjustment based on incorrect ranging results is prevented by making the direction determination "retain".

Next, sort processing in accordance with defocus amount is performed (S37). In this step, defocus amounts are sequentially reorganized from closest range, except for ranging points for which direction determination result is "indeterminate" and "retain". In a case where a subject is a subject for which phase difference AF is difficult, in an environment where precision of phase difference AF is difficult to guarantee, such as in low brightness, and depending on structure, such as arrangement of phase difference detection pixels, there may be cases where erroneous ranging is difficult to eliminate, even if the phase difference direction determination and retention determination processing is performed for individual areas. With this embodiment, therefore, processing is performed assuming that there is erroneous ranging. Specifically, in cases where specified criteria are met, defocus amount for the closest range is not used in focus adjustment (refer to step S41 regarding this point). Details of the sort processing in accordance with defocus amount will be described later using FIG. 9A and FIG. 9B.

If the sort processing in accordance with defocus amount has been performed, it is determined whether processing has been completed for all areas in which normal correlation calculation processing is performed, and if processing has not been completed the processing of steps S33 to S37 is executed for the next area (S39).

If the processing of steps S33 to S37 has been performed for all areas within the focus detection area 31, next adopted ranging point selection processing is performed (S41). In this step, ranging points where ranging result is at the closest range are rejected because of the possibility of erroneous ranging, and focus detection (AF) is performed using ranging points that are more toward the long distance side than the ranging points that have been rejected. However, the number of ranging points that are rejected is changed depending on the number of individual areas and other conditions. Detailed operation of this adopted ranging point selection processing will be described later using FIG. 10.

Next, representative (exemplary) defocus amount selection processing is performed (S43). In this step a defocus amount for the closest range, among defocus amounts that have had ranging points that were rejected removed, is made a representative defocus amount. Specifically, a defocus amount that will constitute a representative is determined from among ranging results (defocus amounts) that have been ranged in a plurality of individual areas. The representative defocus amount is taken into account in each of the processes of the step phase processing that was shown in FIG. 4 (refer, for example, to S7, S9 and S11).

Once a representative defocus amount has been selected, next, extended correlation ranging result determination processing is performed (S45). In this step, for an extended correlation area for which correlation calculation is performed in a wider correlation range than for a normal correlation area, determination is performed based on that ranging result. Specifically, the AF control circuit performs correlation calculation using signals from phase difference detection pixels within an extended correlation area, and defocus amount is calculated. In an extended correlation area having a wider region in which correlation calculation is performed than a normal correlation area, it is possible to perform phase difference detection even for a defocus amount that is so large that phase difference cannot be detected with normal correlation. This defocus amount that has been calculated is compared with the threshold value (±1Fδ) that was shown in FIG. 6, and which of infinity, in focus, and close range is determined, similarly to step S33. Also, in a case where ranging is not possible, indeterminate is determined (refer to FIG. 8). Also, the processing of steps S35 and s37 is executed.

If extended correlation ranging result determination processing has been performed, next, overall phase difference direction determination processing is performed (S47). Here, an overall direction determination result is obtained using direction determination results for each ranging point for normal correlation in steps S31 to S39, and direction determination results for extended correlation of step S45. At this time, direction determination results for ranging points that were rejected in step S41 are not used. Detailed operation of this overall phase difference direction determination processing will be described later using FIG. 15 to FIG. 16B.

If overall phase difference direction determination processing has been performed, retention determination processing for overall phase difference direction determination is performed (S49). With movie AF, if drive direction of the focus lens changes abruptly based on direction determination result an image will become unattractive, and it can be considered that reliability of direction determination result for a state where direction determination result is changing abruptly is low. Therefore, in this step a final phase difference direction determination is made "retain" until the (overall phase difference) direction determination result is stabilized, and after stabilization a final phase difference direction determination is decided. Also, when the final phase difference direction determination is other than retain, the representative defocus amount that was acquired in step S43 is maintained as a valid defocus amount. This valid defocus amount is taken into consideration in step S123 for lens processing of FIG. 19, and is used in determination of lens drive execution.

In this way, in the flow for phase difference direction determination (refer to FIG. 7) correlation calculation is performed for every individual area within the focus detection area 31 to calculate defocus amount (refer to S33). Sorting is performed to arrange the defocus amounts that have been calculated in order from the closest range (refer to S37). Selection of ranging point (defocus amount) adopted in focus detection is then performed using this sorting result and a specified condition (refer to S41). In this way, by excluding ranging data at the close-range side under various conditions while prioritizing ranging data at the close-range side that has been assumed to be the main subject, it is possible to avoid lowering of focus precision due to erroneous ranging.

It should be noted that with this embodiment, the sort processing in step S37 is executed at the time of normal correlation processing for every individual area in steps S31 to S37. However, sort processing may also be executed after completion of normal correlation processing for all individual areas, in step S39.

Next, the sort processing in accordance with defocus amount of step S37 will be described using FIG. 9A and FIG. 9B. As was described previously, that fact that focus detection is performed using phase difference AF means that excluding erroneous ranging for unwanted subjects is difficult. With this embodiment, therefore, processing is performed assuming that there is erroneous ranging. Generally, since it is often the case that a subject that is at the close side is the main subject, it is preferable to focus at a ranging point that is ranging the closest range, among individual areas (ranging points) within the focus detection area 31.

However, with this method, in a case where a ranging result is being erroneously ranged at closer range side, there will no longer be focus on any positions of an image having a plurality of ranging points. If it is assumed that there is erroneous ranging, it would be better to adopt a ranging result at the closest range, and it is preferable to select an appropriate value from among ranging results. As preparation for this, ranging results for each ranging point are sorted from the closest range. However, (1) areas where direction determination is retained have low reliability to begin with and are excluded from being sort objects, and (2) a specified number of ranging points are sorted and temporarily stored, from those with largest defocus amount (with the example shown in FIG. 9A there are nine ranging points stored). This specified number may be appropriately determined in accordance with design.

Figure 9A:
FIG. 9A and FIG. 9B are tables for describing sort processing in accordance with defocus amount, in the camera of one embodiment of the present invention.

FIG. 9A is an example where the focus detection area has been divided into 3×3, namely 9. Within the focus detection area 31a (refer to FIG. 2A), there is division into No. 1 to No. 9, as shown in table 51 in FIG. 9A, and within these nine, ranging results of Nos. 3, 7 and 9 are either indeterminate or retain. Table 52 in FIG. 9A is areas that are neither indeterminate or retain having been arranged in order from the closest range. Similarly, FIG. 9B is an example where an individual area within the focus detection area 31b (refer to FIG. 2B) has been divided into 5×5, namely 25. Within the focus detection area 31 there is division into No. 1 to No. 25, as shown in table 53 in FIG. 9B, and within these twenty five, only ranging results of Nos. 1, 2, 7, 8, 12 to 14, and 18 are not indeterminate or retain. Table 54 in FIG. 9B is areas that are neither indeterminate or retain having been arranged in order from the closest range.

Next, the adopted ranging point selection processing of step S41 (refer to FIG. 7) will be described using the flowchart shown in FIG. 10. As was described previously, since there is a possibility of ranging data at the closest range being erroneous ranging, in a case where ranging data (defocus amount) for each ranging point has been arranged in close distance order (order of larger defocus amount) from ranging data (defocus amount) at the closest range, it is determined after what number of ranging point from the closest range (closest, second closest, third closest, etc.) will be adopted, by various determinations. Specifically, what number ranging point from the closest range will be adopted is determined in accordance with disturbance conditions, number of ranging points, and defocus amount conditions. It should be noted that the expression disturbance here represents deliberate movement of the camera such as panning or tilting, unintentional movement of the camera such as camera shake, instability of face detection information, and subject movement etc.

If the flow shown in FIG. 10 is commenced, it is first determined whether or not closest range rejection conditions apply (S51). Here, it is determined whether or not ranging data for the closest range is to be rejected. Specifically, here, if conditions that will be described later are satisfied, ranging points that will be adopted are selected in steps S53 to S57. On the other hand, if these conditions are not satisfied, ranging data for the closest range is adopted in direction determination (refer to S59).

Conditions for rejecting the ranging data at the closest range in step S51 are (1) gyro output is currently stable, and (2) motion vectors are currently stable. When gyro output is unstable, and there is change to motion vectors, there is a possibility that subject distance is changing. In this case, if ranging data for the closest range is not adopted, there is a possibility that it will fail in tracking subject change for focusing. Also, when there is this type of disturbance, even if there is slight deviation in focus with the occurrence of slight erroneous ranging, since a movie image to be stored is also in an unstable state, as a movie it does not become uncomfortable to view. It should be noted that gyro output is output of the gyro sensor circuit 9 and motion vectors are detected by the image processing circuit 14, and the CPU 11 determines respective stability by repeatedly monitoring gyro output and motion vectors.

If the result of determination in step S51 is that closest range rejection conditions are satisfied, selection processing is performed in accordance with number of ranging points (S53). It can be considered that if there are more ranging points (individual areas) constituting targets for focus detection, there will also be more ranging points that are being erroneously ranged. In this step, therefore, the number of ranging points that are candidates for being adopted is changed in accordance with the number of target ranging points. FIG. 11 shows examples of numbers of ranging points that are candidates to be adopted. For example, in a case where there are nine ranging points (3×3, refer to FIG. 2A), ranging points having a defocus amounts that are second and subsequent from the closest range are made candidates for adoption, and only the single ranging point for the closest range is rejected. Also, in a case where there are twenty five ranging points (5×5, refer to FIG. 2B), ranging points having defocus amounts that are fourth and subsequent from the closest range are made candidates for adoption, and ranging points from the closest range to the third closest are rejected. Generally speaking, it is better to reject more ranging points the more ranging points there are. A ranging point that is closest to the close-range side (closest range) is then adopted from among the ranging points that are candidates for adoption, and ranging data for that ranging point is selected.

Figure 9B:
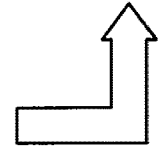

Regarding ranging points that are candidates for adoption, if a case that has been applied to FIG. 9A and FIG. 9B is described, in FIG. 9A there are nine ranging points (3×3) and ranging points that are second closest range, and subsequent ranging points, are made candidates for adoption, and so area No. 8 having closest range order 2 (ranging value 12.3) is selected. Also, in FIG. 9B, there are twenty five ranging points (5×5) and ranging points that are fourth closest range, and subsequent ranging points, are made candidates for adoption, and so area No. 18 having closest range order 4 (ranging value 12.3) is selected. It should be noted that it is also possible to have a system whereby ranging points are selected from a specified order (for example second) instead of from the closest range, among ranging points that are candidates for adoption.

In this way, in FIG. 11 ranging points having ranging data (defocus amount) at nth and subsequent positions from the closest range are made candidates for adoption, and ranging points having ranging data at n−1th positions from the closest range are excluded. Conversely, as a modified example, it is also possible to make ranging points having defocus amount (ranging data) that is outside a specified defocus amount range, from defocus amount (ranging data) for the closest range, candidates for adoption, and to exclude ranging points inside the specified defocus amount range. It is also possible, in a case where number of ranging points is 25 (5×5), to make the specified defocus amount range for excluding ranging points larger than in the case where the number of ranging points is 9 (3×3).

If selection processing in accordance with number of ranging points has been performed on step S53, ranging not possible ranging points are considered (S55). Depending on the processing of steps S51 and S53 etc., there may be case where only ranging not possible ranging points (individual areas) remain. In this case, in order to avoid continuation of state where Bokeh arises with focus being fixed due to ranging being not possible, ranging points that were temporarily rejected are also adopted. For example, the example shown in FIG. 12A shows a case where it is only possible to perform ranging in a single area, in the case of 3×3 ranging points. In the case of 3×3 ranging points, ranging points that are second closest and subsequent from the closest range are made candidates for adoption, but since only the ranging point (ranging data) at the closest range remains, that closest range ranging point that was temporarily rejected is adopted. Also, with the example shown in FIG. 12B a case is shown where it is only possible to perform ranging in two areas, in the case of 5×5 ranging points. With the selection of step S53, ranging data from the closest range to the third closest is rejected, and ranging data for the fourth from the closest and subsequent are made targets for adoption, but with this example, all ranging points from the closest range to the fourth closest are invalid (ranging not possible), ranging data that can be adopted does not exist, and ranging becomes impossible. Therefore, ranging data +2Fδ of the second closest ranging point from the closest range for which ranging result remains is adopted.

If the ranging not possible ranging points have been considered in step S55, next, reselection processing is performed in accordance with defocus amount from the closest range (S57). In an arrangement where sorting has been performed in close distance order from the closest range, in the event that it has been determined that the possibility of there being erroneous ranging is low, from a relative relationship between defocus amounts (ranging data) corresponding to ranging points at the close-range side, including the closest range, even if there is ranging data at the close-range side that has been excluding by temporary rejection, that ranging data is adopted. Since errors due to erroneous ranging are often negligible if a defocus error between first ranging data, which is at the closest range, and second ranging data is large, it is determined that the possibility of that defocus error having been caused by erroneous ranging is low. Also, in a case where the difference between the closest range first ranging data and the second ranging data is small, then even if focusing is performed to a second ranging point using the second ranging data it can be more or less considered that the closest range ranging point is also focused on, and so there is sufficient focusing precision as a movie. That is, even in a case where ranging data at the closest range is not erroneous ranging, there is no problem with regards to image quality if the second ranging data from the closest range is adopted. Details of the reselection processing in accordance with defocus amount from the closest range will be described later using FIG. 13A to FIG. 13C, and FIG. 14.

Returning to Step S51, in a case where a closest range rejection condition is not satisfied, ranging points that are rejected are not set (S59). In this case, it is a case where it is not possible to detect ranging results that are stable in time series, and is a case where it is assumed that that shooting is performed while the camera is moving, such as the user performing panning shooting or tilt shooting, or that the subject is moving. It is also a case where a moving subject is being photographed. In this type of case, even if focusing is loose with slight erroneous ranging, it does not result in an unattractive movie, and so defocus amount at the closest range is selected without setting ranging points that will be rejected.

If the reselection processing in accordance with defocus amount from the closest range of step S57 has been performed, or if there were no rejected ranging points step S59, the adopted ranging point selection processing is completed and the originating flow is returned to.

In this way, in the flow for adopted ranging point selection processing, if ranging results that have not been stable in time series are being detected (S51 Yes), ranging points having defocus amount that is a specified ranking from the closest range are removed, and ranging results are selected from the remaining range results so as to perform focus adjustment (S53 to S57). As a result of this processing, at times such as when following a subject by moving the camera, AF followability is ensured by adopting defocus amount for the closest range, and at other times it is possible to ensure AF precision by focusing with ranging points that have the possibility of erroneous ranging excluded.

The range (ranking) of ranging points to be made candidates for adoption is changed depending on number of phase difference ranging points (refer to S53 in FIG. 10). This is because it can be considered that the number of ranging points that will be erroneously ranged also differs depending on the number of individual areas within the focus detection area. It should be noted that regardless of the number of individual areas the range (ranking) for making candidates for adoption may also be changed in accordance with size of individual areas (number of pixels contained in the individual area). This is because it can be considered that the number of ranging points that will be erroneously ranged will also differ depending on the size of the individual area.

Also, in a case where ranging results are not stable in time series, no ranging points are rejected (S51 No→S59). In cases such as where the user is moving the camera in order to perform pan or tilt shooting, and when the subject is moving, an unattractive movie image does not result even if focusing is performed loosely with the slight occurrence of erroneous ranging, as was described above. In this case, AF followability is ensured by selecting a ranging point for the closest range from among a plurality of ranging points.

Figure 13A:
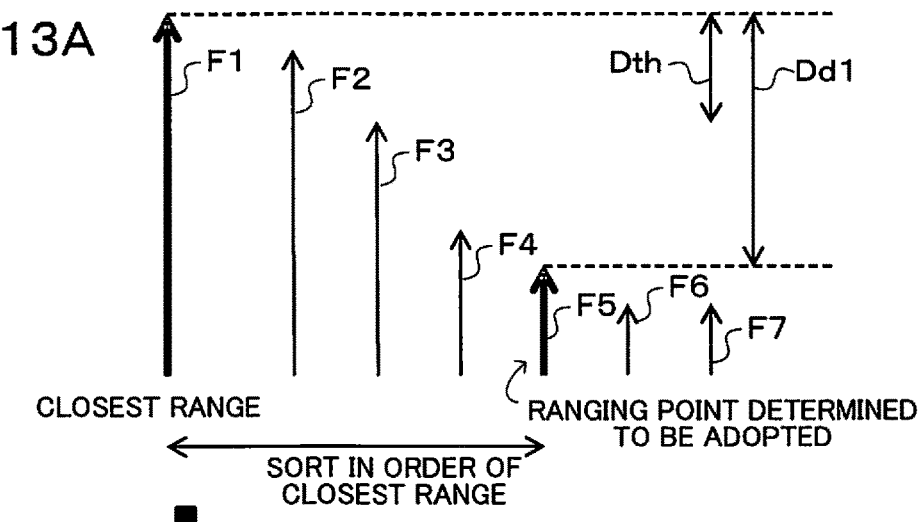
FIG. 13A to FIG. 13C are graphs describing reselection that has taken into consideration defocus amount of a focus lens from the closest distance, in the camera of one embodiment of the present invention.
Figure 13B:
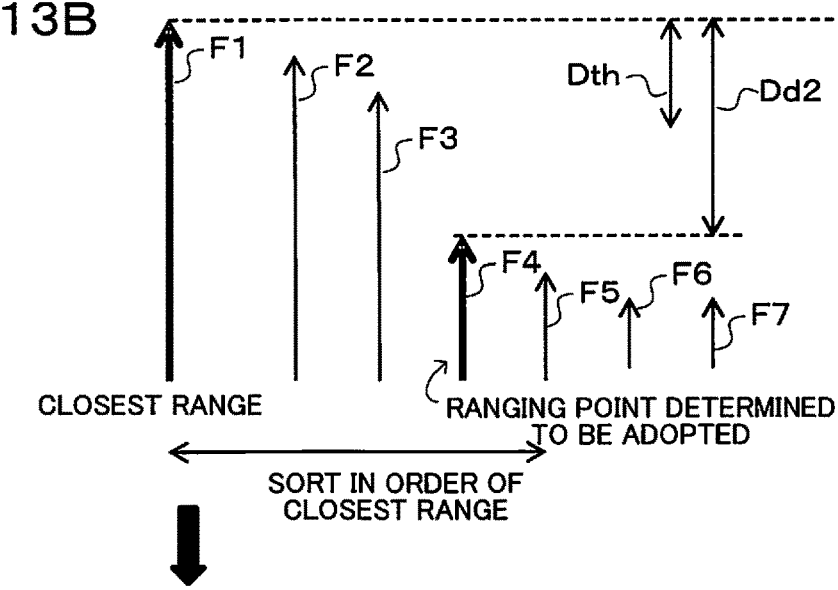
Figure 13C:
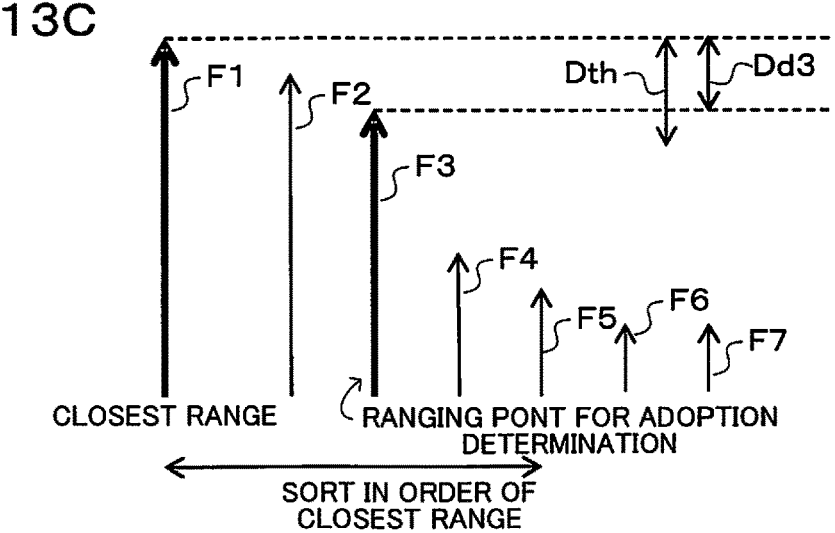

Next, a specific example of reselection processing in accordance with defocus amount from the closest range, of step S57, will be described using FIG. 13A to FIG. 13C. In FIG. 13A to FIG. 13C, the horizontal axis direction represents ranging results that have been sorted in order from the closest range. Also, the vertical axis direction represents defocus amount, and shows larger defocus amount toward the close side as arrows become longer. With the examples shown in FIG. 13A to FIG. 13C, ranging results F1 to F7 of the ranging point (individual areas) are shown arranged in short distance order from the closest range side. Also, Dth represents a threshold value for defocus amount, while Dd1 to Dd3 represent differences between defocus amount at the closest range and defocus amounts for ranging points for which adopted is determined.

In FIG. 13A, ranging data (ranging point) that has been selected in step S53 is made F5, and it is determined whether or not this ranging data will be adopted. If a defocus amount difference Dd1 between ranging result F5 for a ranging point being judged for adoption and ranging result F1 for the closest range is compared with threshold value Dth, then Dd1>Dth. In this case, since the defocus amount difference between ranging point at the closest range and ranging point being judged for adoption is larger than the threshold value Dth the ranging result F5 is not adopted and a ranging point to be determined for adoption is moved by one to the close side.

If the position of the ranging point being judged for adoption in FIG. 13A is moved by one towards the close side, the situation will become as shown in FIG. 13B. In FIG. 13B, if a defocus amount difference Dd2 between ranging result F4 for a ranging point to be judged for adoption and ranging result F1 for the closest range is compared with threshold value Dth, then Dd2>Dth. In this case, since the defocus amount difference between ranging point at the closest range and ranging point being judged for adoption is larger than the threshold value Dth the ranging result F4 is not adopted and a ranging point to be determined for adoption is moved by one to the close side.

If the position of the ranging point being judged for adoption in FIG. 13B is moved by one towards the close side, the situation will become as shown in FIG. 13C. In FIG. 13C, if a defocus amount difference Dd3 between ranging result F3 for a ranging point to be judged for adoption and ranging result F1 for the closest range is compared with threshold value Dth, then Dd3<Dth. In this case, since the defocus amount difference between the ranging point for the closest range and the ranging point to be judged for adoption is smaller than the threshold value Dth, it is determined that this ranging result F3 is a ranging point to be adopted.

Figure 14:
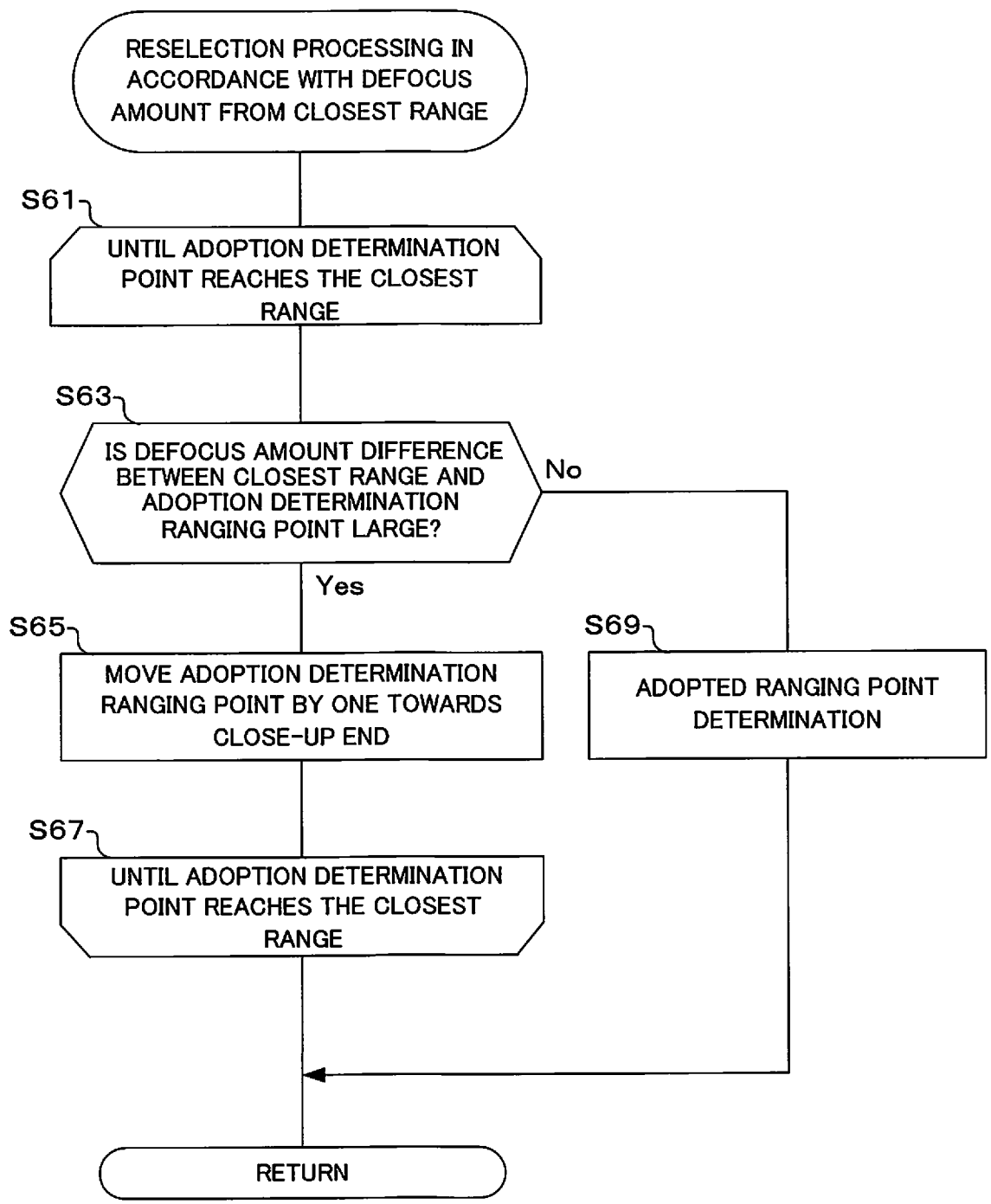
FIG. 14 is a flowchart showing operation of reselection processing in accordance with defocus amount from the closest range, in the camera of one embodiment of the present invention.

Next, detailed operation of the reselection processing in accordance with defocus amount from the closest range, in step S57 (refer to FIG. 10), will be described using the flowchart shown in FIG. 14. If the flow shown in FIG. 14 is commenced, then in steps S61 to S67 a difference in defocus amount for the closest range and for a ranging point that will be judged for adoption (also called adoption determination ranging point) is compared with a threshold value, and processing is repeated until an adopted ranging point is determined, based on the result of comparison.

It is first determined whether or not a difference between defocus amounts for the closest range and a ranging point that will be judged for adoption is large (S63). As was described using FIG. 13A to FIG. 13C, a difference between defocus amount for the closest range (refer to F1) and defocus amount for ranging points that will be judged for adoption (refer to F5, F4, F3) is calculated, and this difference (refer to Dd1 to Dd3) is compared with a threshold value. If an error of defocus amount due to erroneous ranging is made 2Fδ to 3Fδ, a threshold value may be made 5Fδ, for example. This threshold value may also be changed in accordance with number and size of individual areas.

If the result of determination in step S63 is that a difference between defocus amounts of a ranging point at the closest range and a ranging point that is being determined for adoption is larger than the threshold value, a ranging point being judged for adoption is moved by one toward the close side (S65). Here, position of an adoption determination ranging point is moved by one to the close side, so that position of a ranging point to be judged for adoption of FIG. 13B has been moved from the position of the ranging point to be judged for adoption of FIG. 13A. Once the ranging point has been moved comparison is performed again in step S63, In step S67, if ranging point to be judged for adoption reaches a ranging point at the closest range, the ranging point for the closest range is adopted, this flow is completed and processing returns to the originating flow. In a case where this type of loop processing has been performed until the end is reached, the ranging point for the closest range is adopted, and focusing is performed to the ranging point for the closest range. This case is where a difference between a defocus amount of a first ranging point that is at the closest range and defocus amount of a second ranging point is large (larger than Dth), and so it can be considered that the possibility of the ranging data at the closest range being erroneous ranging is low, and ranging point (ranging data) for the closest range is adopted.

On the other hand, if the result of determination in step S63 is that the difference is smaller than the threshold value, it is determined as a ranging point to be adopted (S69). Here, since the difference between defocus amounts for a ranging point out the closest range and arranging points that is being judged for adoption is not larger than the threshold value, that ranging point for which adoption is being determined is adopted. If a ranging point has been adopted in step S69, this flow is completed on the originating flow is returned to.

In this way, in the flow for re-selection in accordance with defocus amount from the closest range, a defocus amount from a ranging point at the closest range to a ranging point that will be employed becomes a specified range. Specifically, a defocus amount (refer to F3) at the infinity side within a fixed defocus range (refer to Dth) from the defocus amount for the closest range (refer to F1) is employed. As a result, even if the ranging data at the closest range is not erroneous ranging it becomes possible to achieve a focused state to an extent that a subject at the closest range is also be considered to be in focus. Then, since defocus amount F2 for the close side within the fixed defocus range (Dth) also has a high possibility of being erroneous ranging, it is not employed. It should be noted that in FIG. 13A to FIG. 13C and FIG. 14, sequential comparison has been performed from a ranging point to be determined for adoption that is at a distance from the closest range, but conversely, sequential comparison may be performed from a ranging point to be determined for adoption that is closer to the closest range.

Also, although defocus amounts are sorted and a defocus amount that is further towards the close side than a specified ranking is selected as a ranging result, this is not limiting, and if ranging points are grouped together spatially these ranging results may be adopted. In this case, an average value of a plurality of ranging result may be adopted, and a ranging result among a plurality of range results that is furthest toward the infinity side away may be selected. Spatially grouped indicates a state where coordinates of individual areas, for example, are adjacent in any of the vertical or horizontal directions. Taking FIG. 9B as an example, ranging points No. 1 and No. 2 are more to the close side than a specified ranking, and it is possible to consider that these ranging points are spatially grouped.

Next, the overall phase difference direction determination processing of step S47 (refer to FIG. 7) will be described using the table shown in FIG. 15, and the flowcharts shown in FIG. 16A and FIG. 16B. This overall phase difference direction determination processing is direction determination using phase difference AF overall, using results of normal correlation calculation processing and results of extended correlation calculation processing.

The table shown in FIG. 15 shows overall phase difference direction determination result (refer to the rightmost column in FIG. 15) for direction determination results (specifically, either of "close range", "in-focus", "infinity", "indeterminate" and "retain") using normal correlation calculation (refer to S33 in FIG. 7), and for direction determination results (specifically, either of "close range", "in-focus", "infinity", or "indeterminate") using extended correlation calculation (refer to S45 in FIG. 7). In columns corresponding to normal correlation calculation (direction determination results) in FIG. 15, the symbol "○" means a case where there is an area of the relevant ranging result (direction determination result), "×" means that there is not an area of the relevant ranging result (direction determination result), and "–" means not relevant, namely, that it doesn't matter whether there is or is not a ranging result (direction determination result). Areas that are subjects for normal correlation calculation are in the focus detection area 31, and within this area a plurality of individual areas are contained (with the example shown in FIG. 2A, nine individual areas). "○" includes a case where there is a single relevant ranging result (direction determination result) within a plurality of individual areas.

As will be understood from the table of FIG. 15, if a result of normal correlation calculation is that a direction determination result of a single individual area has been determined to be "close range" the overall phase difference direction determination result becomes "close range" (refer to line A1). Generally, a subject that is more to the close side will often be the main subject. As requirements for focus precision become stricter with the advancement in high image quality, larger lens maximum opening diameter, and increase in size of image sensors, more accurate focus on a close range subject is required.

Also, in case where there is not even a single individual area for which it has been determined that direction determination result is close range, and there is at least a single area that has been determined to be in-focus, overall phase difference direction determination result will be different depending on whether or not it retain as been determined in a result of normal correlation direction determination. In this case if there is not even a single individual area for which retain has been determined, the overall phase difference direction determination result becomes "in-focus" (refer to line A2). Also, if there is even only one individual area for which retain has been determined, the overall phase difference direction determination result becomes "retain" (refer to line A3). If there is not an individual area that has been determined to be close range, there is an individual area that been determined to be in-focus, and there is no individual area in which retain has been determined, in-focus is determined. In this case there is a possibility of detecting the existence of a subject that is more to the close side than an in-focus position from extended correlation calculation, but since extended correlation calculation has worse ranging precision than normal correlation calculation, extended correlation calculation results are disregarded in this case.

Also, in the event that there is not even a single individual area in which a normal correlation direction determination result is that close range or in-focus has been determined, and there is even a single individual area in which the normal correlation direction determination result is that infinity has been determined, a direction determination result for extended correlation calculation is taken into consideration. Specifically, if a direction determination result using extended correlation calculation is close range, the overall phase difference direction determination result is made "close range" (refer to line A4), while if a direction determination result using extended correlation calculation is other than close range the overall phase difference direction determination result is made "infinity" (refer to line A5).

Also, in the event that there is not even a single individual area in which a normal correlation direction determination result of close range, in-focus or infinity has been determined, and there is even a single individual area in which indeterminate has been determined, a direction determination result for extended correlation calculation is taken into consideration. Specifically, if a direction determination result using extended correlation calculation is close range, the overall phase difference direction determination result is made "close range" (refer to line A6), while if a direction determination result using extended correlation calculation is other than close range the overall phase difference direction determination result is made "indeterminate" (refer to line A7).

Also, in the event that there is not even a single individual area in which a normal correlation direction determination result of close range, in-focus, infinity or indeterminate has been determined, and there is even a single individual area in which retain has been determined, a direction determination result for extended correlation calculation is taken into consideration. Specifically, if a direction determination result using extended correlation calculation is close range, the overall phase difference direction determination result is made "close range" (refer to line A8), while if a direction determination result using extended correlation calculation is other than close range the overall phase difference direction determination result is made "retain" (refer to line A9).

Figure 16A:
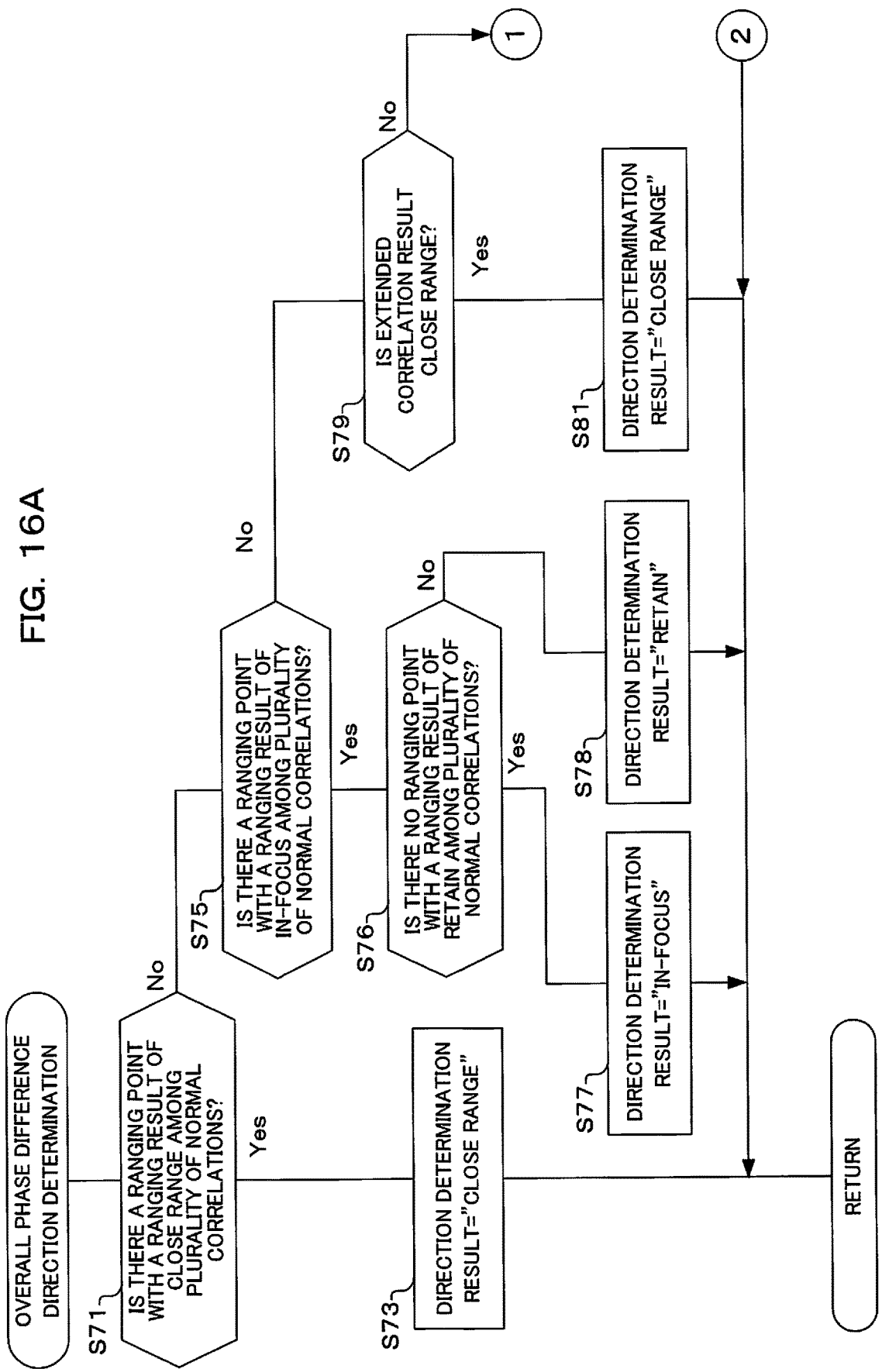

The flowcharts shown in FIG. 16A and FIG. 16B are processing routines for implementing the relationships shown in the table of FIG. 15. If the flow for overall phase difference direction determination processing is commenced, first, it is determined whether or not there is a ranging result (direction determination result) that is a close range ranging point within a plurality of normal correlations (S71). Here, as was described on line A1 in FIG. 15, it is determined whether or not there is even a single individual area, among a plurality of individual areas of the focus detection area 31, where ranging result (direction determination result) has become close range. If the result of this determination is Yes, (overall phase difference) direction determination result="close range" is set (S73).

If the result of determination in step S71 is No, it is next determined whether or not there is a ranging point with a ranging result (direction determination result) of in focus among a plurality of normal correlations (S75). Here, as was described on line A2 and line A3 in FIG. 15, it is determined whether or not there is even a single individual area, among a plurality of individual areas of the focus detection area 31, where ranging result (direction determination result) has become in-focus.

If the result of determination in step S75 is Yes, it is next determined whether or not there is no ranging point with a ranging result of retained among a plurality of normal correlations (S76). If the result of this determination is Yes (no ranging point with retain) direction, (overall phase difference) direction determination result="in-focus" is set (S77). This case corresponds to line A2 in FIG. 15. On the other hand, if the result of determination in step S76 is No (there is a ranging point of retain), (overall phase difference) direction determination result="retain" is set (S78). This case corresponds to line A3 in FIG. 15.

If the result of determination in step S75 is No, it is next determined whether or not a result for extended correlation (direction determination result) is close range (S79). Here, as was described on line A4, line A6 and line A8 in FIG. 15, if there was not even a single individual area, among the plurality of individual areas of the focus detection area 31, for which a ranging result (direction determination result) has become close range and in-focus, it is determined whether or not a result for extended correlation (direction determination result) is close range. If the result of this determination is Yes, (overall phase difference) direction determination result="close range" is set (S81).

If the result of determination in step S79 is No, it is next determined whether or not there is a ranging point with a ranging result (direction determination result) of infinity among a plurality of normal correlations (S83). Here, as was described on line A5 in FIG. 15, it is determined whether or not there is not even a single individual area, among the plurality of individual areas of the focus detection area 31, for which a ranging result (direction determination result) has become close range and in-focus, but there is at least one individual area in which ranging result (direction determination result) has become infinity. In this case, from the determination of step S79 the direction determination result for extended correlation is not close range. If the result of determination in step S83 is Yes, (overall phase difference) direction determination result="infinity" is set (S85).

If the result of determination in step S83 is No, it is next determined whether or not there is a ranging point (ranging area) with a ranging result (direction determination result) of indeterminate among a plurality of normal correlations (S87). As was described on line A7 in FIG. 15, it is determined whether or not there is not even a single individual area, among the plurality of individual areas of the focus detection area 31, for which a ranging result (direction determination result) has become close range, in-focus, or infinity, but there is at least one individual area in which ranging result (direction determination result) has become indeterminate. It should be noted that with this determination in step S87, a case where a direction determination result for extended correlation becomes close range has been excluded in the determination of step S79. If the result of determination in this step S87 is Yes, (overall phase difference) direction determination result="indeterminate" is set (S89).

On the other hand, if the result of determination in step S87 is No, (overall phase difference (direction determination result)="retain" is set (S91). As was described on line A9 in FIG. 15, it is determined whether or not there is not even a single individual area, among the plurality of individual areas of the focus detection area 31, for which a normal correlation ranging result (direction determination result)

has become close range, in-focus, infinity, or indeterminate, but there is at least one individual area in which ranging result (direction determination result) has become retain. It should be noted that a case where a direction determination result for extended correlation becomes close range has been excluded in the determination of step S79.

If determination of (overall phase difference) direction determination result has been performed in steps S73, S77, S78, S81, S85, S89 and S91, the originating flow is returned to.

In this way, with the overall phase difference direction determination processing (refer to FIG. 16A and FIG. 16B), if there is close range among ranging results (direction determination results) of the plurality of normal correlations, the overall phase difference direction determination result is determined to be "close range" (refer to S71 and S73). Since precision of normal correlation is high, and the possibility of a subject more towards the close side being the main subject is high, the overall phase difference direction determination result is made close range. Also, if there is not close range and retain among ranging results (direction determination results) of a plurality of normal correlations, and there is in-focus, the overall phase difference direction determination result is determined to be "in-focus" (refer to S75, S76 and S77). Since precision of normal correlation is high, overall phase difference direction determination result is made "in-focus". On the other hand, if there is not close range and there is in-focus among ranging results (direction determination results) of a plurality of normal correlations, and there is retain, the overall phase difference direction determination result is determined to be "retain" (refer to S75, S76 and S78).

Also, with the overall phase difference direction determination processing (refer to FIG. 16A and FIG. 16B), if there is not close range or in-focus among ranging results direction determination results) for normal correlation, if a result (direction determination result) for extended correlation is close range then the overall phase difference direction determination result is determined to be "close range" (refer to S79 and S81). Precision of extended correlation is lower than that for normal correlation, but if there is a subject that is more to the close side end there is a possibility that it will be a main subject, and so the overall phase difference direction determination result is made close range. Also, when a result (direction determination result) for extended correlation is not close range or in-focus, and a result (direction determination result) for extended correlation is not close range, if there is infinity among the ranging results (direction determination results) of a plurality of normal correlations, the overall phase difference direction determination result is determined to be "infinity" (refer to S79, S83 and S85). If a result of extended correlation for close range priority is "close range", "close range" is adopted, but if a result of extending correlation is not "close range", in the event that a result using high precision normal correlation is "infinity", then a determination of "infinity" is adopted.

In a case where there is an indeterminate ranging point (individual area) among direction determination results for a plurality of normal correlations, the overall phase difference direction determination result is set to "indeterminate" (S87, S89). Also, in a case where there is neither "infinity", "close range", "in-focus", or "indeterminate", the overall phase difference direction determination result is made "retain" (refer to S87 and S91).

Next, the hybrid direction determination of step S5 (refer to FIG. 4) will be described using FIG. 17. In the step phase 41 (refer to FIG. 3), two types of AF detection, namely contrast AF computational processing (refer to S1 in FIG. 4) and phase difference computational processing (refer to S3 in FIG. 4) are performed. With hybrid direction determination, direction for lens drive is finally determined using results for the two types of AF detection, namely contrast AF and phase difference AF.

As will be understood from FIG. 17, if a direction determination result (final overall phase difference direction determination result) using phase difference AF is "close range" or "infinity", then a determination result is made "close range" or "infinity" regardless of a direction determination result using contrast AF (refer to line B1 and line B2). Specifically, although direction determination result for phase difference AF (final overall phase difference direction determination result) is prioritized, if a direction determination result for phase difference AF is not close range or infinity, a direction determination result using contrast AF is used (refer to line B3 to line B5). It should be noted that "else" in FIG. 17 is a case of "in-focus", "indeterminate", or "retain". However, "in-focus" and "retain" are used (refer to S121 and S123) at the time of respective lens drive processing (refer to FIG. 19).

In this way, with the hybrid direction determination, lens drive direction in the step phase 41 is determined using direction determination results for phase difference AF and contrast AF. Also, when performing this determination, direction determination results for phase difference AF are prioritized, and direction determination results for contrast AF are secondary. This means that even in a case where it is not possible to confirm drive direction using phase difference AF, it is possible to use contrast AF results, and so it is possible to perform stabilized control even with scenes for which phase difference AF is difficult.

Figure 18:
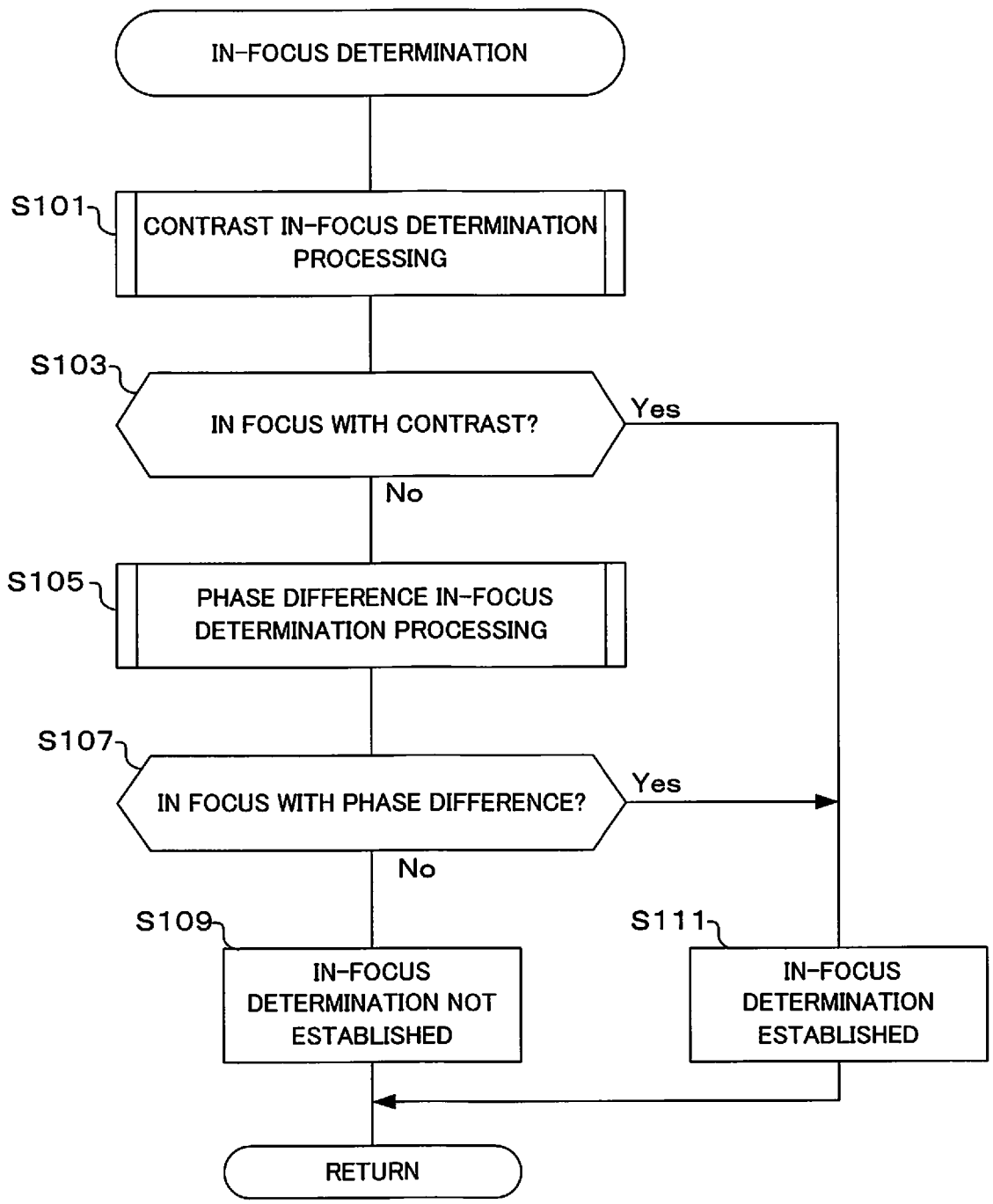
FIG. 18 is a flowchart showing operation of in-focus determination, in the camera of one embodiment of the present invention.

Next, detailed operation of the in-focus determination in step S7 (refer to FIG. 4) will be described using the flowchart shown in FIG. 18. As was described previously, this flowchart performs determination as to whether or not the subject is in focus, using contrast AF and phase difference AF.

If the flow for focus determination is commenced, first, contrast in-focus determination processing is executed (S101). Here, it is determined whether a result of contrast AF computational processing that was performed in step S1 is that a contrast value (focus evaluation value) has reached a peak. For example, it may be determined whether or not a current position is within a range of $\pm 1F\delta$ of an in-focus point, using contrast values of three points that are close to a peak. It is next determined whether or not there is focus using contrast (S103). Here, determination as to whether or not there is focus is based on the determination of step S101.

If the result of determination in step S103 is not in focus, phase difference in-focus determination processing is performed (S105). Here, it is determined whether or not defocus amount is in a range in which in-focus can be achieved, based on the phase difference computational processing that was performed in step S3. It is next determined whether or not there is focus based on phase difference (S107). Here, determination as to whether or not there is focus is based on the determination of step S105.

If the phase difference focus determination of step S105 is that the phase difference direction determination result is in focus without any disturbance, in-focus is set. Specifically, determination conditions are made an AND condition of (A-i) and (A-ii) below.

(A-i) Phase difference direction determination result is "in-focus".

(A-ii) There is no disturbance.

The expression disturbance here represents deliberate movement of the camera such as panning or tilting, unintentional movement of the camera such as camera shake, and instability of face detection information etc. Camera movement is acquired by the gyro sensor circuit 9, and face detection information is acquired by the facial recognition circuit 15. There may also be determination of motion vectors calculated based on image data that is been acquired, and whether or not there is a zoom operation etc.

If the determination result of steps S103 or S107 is Yes, in focus determination is established (S111). On the other hand, if the determination result in step S107 is No, in focus determination is not established (S109). If the determinations of steps S109 or S111 have been performed, the originating processing flow is returned to.

In this way, in the flow for in-focus determination, if in-focus is determined with at least one of results of in-focus determination using contrast AF, and in-focus determination using phase difference AF, it is then determined that it is in focus overall (focus detection device). In the case of movie AF, driving the focus lens is not preferred due to frequent focusing. In the case of in-focus with either method, if in-focus is determined for the overall (focus detection device), practical focus precision is ensured, while being able to prevent frequent focus lens drive. It should be noted that in FIG. 18 determination for contrast AF is performed first, but determination for phase difference AF may be performed first.

Figure 19:
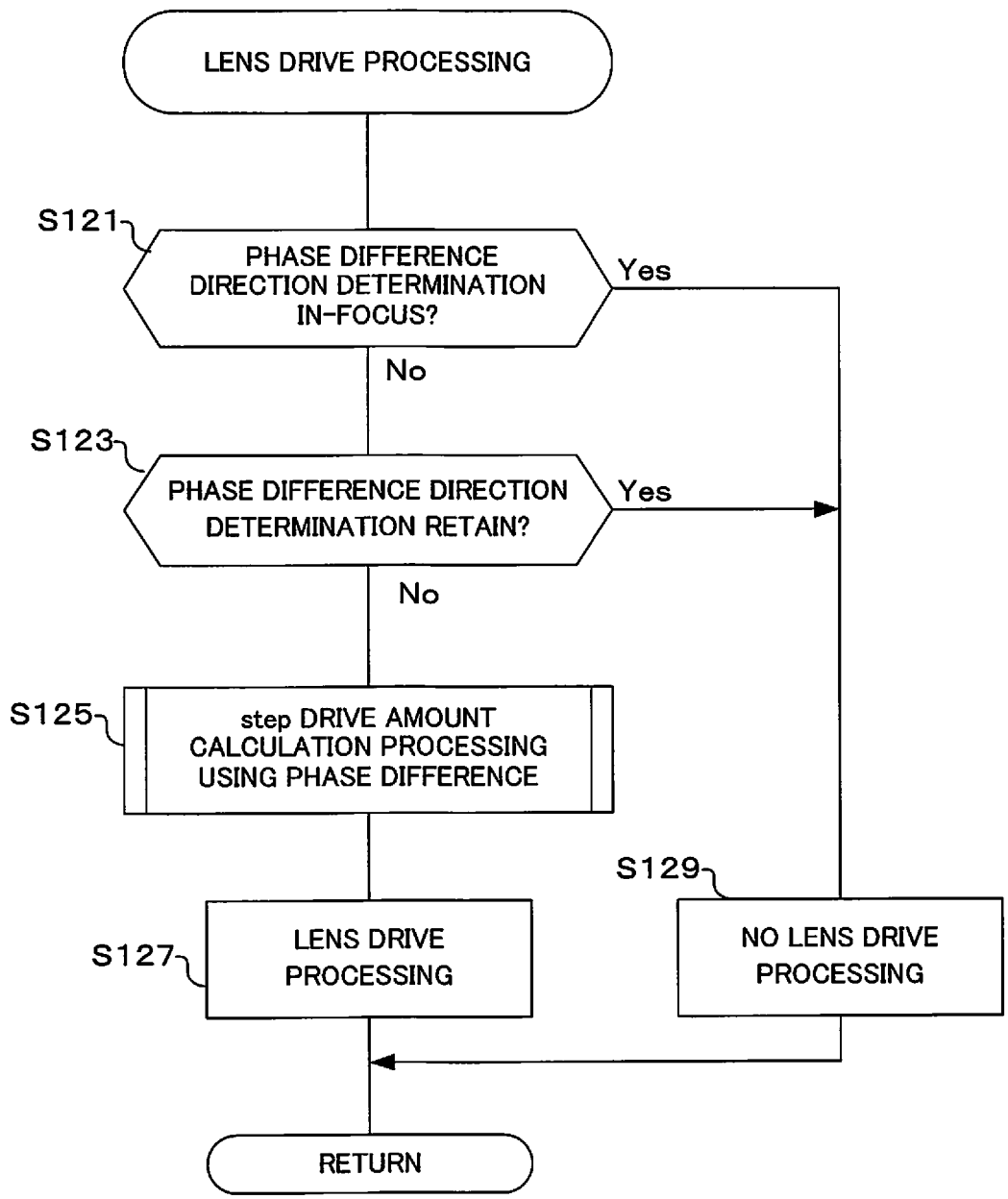
FIG. 19 is a flowchart showing operation of lens drive processing, in the camera of one embodiment of the present invention.

Next, detailed operation of the lens drive processing in step S9 (refer to FIG. 4) will be described using the flowchart shown in FIG. 19. This flow sets step drive amount for the step phase 41 in accordance with defocus amount.

If the flow for lens drive processing is commenced, it is first determined whether or not phase difference direction determination (final overall phase difference direction determination result) is in-focus (S121). Here, determination is based on whether or not final overall phase difference direction determination result in the retention determination processing (refer to S49 in FIG. 7) for overall phase difference direction determination is "in-focus". If the result of this determination is "in-focus", it is determined that there will be no lens drive (S129). During disturbance generation etc. there is in focus with respect to ranging data, but when it is not desired to establish in-focus determination this is valid.

If the result of determination in step S121 is not in-focus, it is determined whether or not a phase difference direction determination (final overall phase difference direction determination result) is retain (S123). Here, determination is based on whether or not final overall phase difference direction determination result in the retention determination processing (refer to S49 in FIG. 7) for overall phase difference direction determination is "retain". Specifically, the retention determination of the phase difference direction determination determines "retain" when an AND condition of (B-i) and (B-ii) below is satisfied.

(B-i) Final overall phase difference direction determination result is "retain".

(B-ii) Absolute value of valid defocus amount is smaller than $10F\delta$.

The phase difference direction determination (final overall phase difference direction determination result) used in step S123 is kept at "retain" until an overall phase difference direction determination result is the same direction continuously for a specified number of times or more. If a final overall phase difference direction determination result is "retain" (B-i), valid defocus amount is referenced, and if, based on the valid defocus amount (Bii), in-focus is nearby (absolute value of valid defocus amount is smaller than $10F\delta$), step drive is not performed. Not performing drive close to in-focus is because it is easy for focus drift to become noticeable in this state. On the other hand, focus drift is not conspicuous in a defocus state, and even if focus may appear to be drifting it is better to prioritize focusing, and so step drive is not restricted.

Accordingly, in a case where the result of determination in step S123 was that a final overall phase difference direction determination result was retain, lens drive is not performed (S129). On the other hand, if the result of determination in step S123 is that the final overall phase difference direction determination result was not retain, step drive amount using phase difference is calculated (S125). Here, step drive amount is determined in accordance with defocus amount (F5) that was ranged in phase difference computational processing, and that was selected in the defocus amount selection processing.

If step drive amount has been calculated in step S125, lens drive is implemented (S127). In this step, the focus lens is driven by the step drive amount that was calculated in step S125, in the drive direction that was determined in the phase difference direction determination result close to an in-focus point, in the step phase 41 (refer to FIG. 3)

If the lens drive has been implemented in step S127, or if it is determined not to perform lens drive in step S129, the originating flow is returned to.

In this flow for lens drive processing, if a final overall phase difference direction determination result is in-focus or retain, lens drive is not performed (S129), while if a final overall phase difference direction determination result is not in-focus or retain, step drive amount corresponding to defocus amount is determined, and step drive is performed (S125, S127). As a result, at the time of movie shooting etc. it is possible to prevent focus appearing unsteady.

As has been described above, in the one embodiment of the present invention, the focus control device has and image sensor 7 that receives light flux that has passed through a photographing lens and is capable of generating a phase difference detection signal. Also, the focus detection section (for example, AF control circuit 12) detects ranging data representing defocus amount based on phase difference detection signals of a plurality of focus detection regions (individual areas) that have been set in a region of the image sensor where the light flux is received. Also, the processor (control section (for example, CPU 11)), with ranging data corresponding to a plurality of focus detection regions (individual areas) being arranged in order of short distance, performs focus adjustment based on ranging data remaining after excluding ranging data in a specified range from ranging data representing a closest range (refer to S37 and S41 in FIG. 7, and to FIG. 10). As a result, it is possible to perform appropriate processing on a main subject. Specifically, even if ranging data at the closest range is erroneous ranging, since it is possible to perform focus adjustment based on ranging data remaining after having excluded ranging data within a specified range from this closest range ranging data, the possibility of focusing on a main subject becomes high.

It should be noted that a camera of one embodiment of the present invention is provided with a combination of contrast AF and phase difference AF, but contrast AF may be omitted. In this case, determination of focus direction his performed with only the focus detection area 31 for normal correlation calculation, and a phase difference detection signal from a focus detection area for extended correlation calculation. Further, determination of focus direction may be performed with only the phase difference detection signal from a focus detection area 31 for normal correlation calculation, with the focus detection area for extended correlation calculation omitted.

Also, with the one embodiment of the present invention the AF control circuit 12, AE control circuit 13, image processing circuit 14, facial recognition circuit 15, and movie storage circuit 16 have been configured integrally with the system controller 10, but the system controller 10 may also be configured separately. It is also possible for some or all of the above described sections to be realized by software using the CPU 11, and to have a hardware structure such as gate circuits that have been generated based on a programming language that is described using Verilog, and also to use a hardware structure that utilizes software such as a DSP (digital signal processor). Suitable combinations of these approaches may also be used. Also, functions being implemented using the CPU 11 and programs may also be implemented using hardware circuits, and may also be implemented using Verilog, a DSP etc.

Also, with the one embodiment of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone a portable information terminal, personal computer (PC), tablet type computer, game console etc., or a camera for a scientific instrument such as a microscope, a camera for mounting on a vehicle, a surveillance camera etc. The present invention may be adopted in an endoscope etc. as a medical camera. By applying the technology of the present invention to an insertion section of an endoscope, it is possible to perform observation image display, still picture shooting continuous shooting, and movie shooting that is in focus while having the insertion part move or stop inside a non-specimen by means of executing phase difference AF and also applying the technology of the present invention. In any event, it is possible to adopt the present invention as long as a device performs focus control.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' unit, 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus control device that has an image sensor that receives light flux that has passed through a photographing lens and is capable of generating a phase difference detection signal, and that executes focus adjustment based on the phase difference detection signal, the focus control device comprising:
    a focus detection circuit that detects ranging data representing defocus amount based on phase difference detection signals of a plurality of focus detection regions that have been set in a region of the image sensor where the light flux is received; and
    a processor that, with ranging data corresponding to a plurality of focus detection regions being arranged in order of short distance, performs focus adjustment based on ranging data remaining after excluding ranging data in a specified range from ranging data representing a closest range, wherein:
    as the specified range, the processor sets a number of ranging data, or sets a specified defocus amount range, based on number or size of the focus detection regions.

2. The focus control device of claim 1, wherein:
    the processor detects ranging data in time series for every focus detection region and evaluates stability of a plurality of ranging data, and with ranging data of focus detection regions that have been evaluated as being stable arranged in order of short distance, performs focus adjustment based on ranging data remaining after excluding ranging data within a specified range from ranging data representing a closest range.

3. The focus control device of claim 1, wherein:
    the processor performs focus adjustment based on ranging data representing the closest range, among the remaining ranging data.

4. The focus control device of claim 1, wherein:
    the processor performs focus adjustment based on ranging data that is a specified number away from the closest range, among the remaining ranging data, in accordance with number or size of the plurality of focus detection regions.

5. The focus control device of claim 2, wherein:
    the processor, in the event that the ranging data has been evaluated in time series as not being stable, does not exclude ranging data within a specified range from ranging data indicating the closest range from among ranging data corresponding to the plurality of focus detection regions, and selects ranging data used in focus detection from among all ranging data.

6. The focus control device of claim 1, wherein:
    the processor performs focus adjustment based on ranging data within a specified range from ranging data indicating the closest range, in the event that the remaining ranging data, of ranging data corresponding to the plurality of focus detection regions, is ranging not possible.

7. The focus control device of claim 1, wherein:
the processor, in the event that, in ranging data corresponding to a plurality of focus detection regions, a plurality of focus detection regions corresponding to ranging data within a specified range are adjacent, performs focus adjustment based on ranging data of the plurality of adjacent focus detection regions.

8. The focus control device of claim 1, wherein:
in the event that the specified range is made a specified number, the processor determines whether or not ranging data that has been detected by the focus detection circuit is valid for each of the focus detection regions, and if, among ranging data that has been determined to be valid, a number of ranging data within a specified range from ranging data indicating the closest range is less than a specified number, selects from ranging data within the specified range.

9. The focus control device of claim 1, wherein:
in the event that the specified range is made a specified number, if a difference between defocus amount at the closest range and defocus amount of ranging data indicating closest range, among the remaining ranging data, is larger than a specified threshold value, the processor performs focus adjustment based on the closest range ranging data, among the remaining ranging data.

10. A focus control method, for a focus control device that has an image sensor that receives light flux that has passed through a photographing lens and is capable of generating a phase difference detection signal, and that executes focus adjustment based on the phase difference detection signal, the focus control device comprising:
detecting ranging data representing defocus amount based on phase difference detection signals of a plurality of focus detection regions that have been set in a region of the image sensor where the light flux is received;
arranging ranging data corresponding to the plurality of focus detection regions in order of short distance; and performing focus adjustment based on remaining ranging data after having excluded ranging data within a specified range from ranging data representing closest range; and
as the specified range, setting a number of ranging data, or setting a specified defocus amount range, based on number or size of the focus detection regions.

11. The focus control method of claim 10, further comprising:
detecting ranging data in time series for every focus detection region and evaluating stability of a plurality of ranging data, and with ranging data of focus detection regions that have been evaluated as being stable arranged in order of short distance, performing focus adjustment based on ranging data remaining after excluding ranging data within a specified range from ranging data representing a closest range.

12. The focus control method of claim 10, further comprising:
performing focus adjustment based on ranging data representing the closest range, among the remaining ranging data.

13. The focus control method of claim 10, further comprising:
performing focus adjustment based on ranging data that is a specified number away from the closest range, among the remaining ranging data, in accordance with number or size of the plurality of focus detection regions.

14. The focus control method of claim 11, further comprising:
in the event that the ranging data has been evaluated in time series as not being stable, not excluding ranging data within a specified range from ranging data indicating the closest range from among ranging data corresponding to the plurality of focus detection regions, and selecting ranging data used in focus detection from among all ranging data.

15. The focus control method of claim 10, further comprising:
in the event that, in ranging data corresponding to the plurality of focus detection regions, the remaining ranging data is ranging not possible, performing focus adjustment based on ranging data within a specified range from ranging data indicating the closest range.

16. The focus control method of claim 10, further comprising:
in the event that, in ranging data corresponding to a plurality of focus detection regions, a plurality of focus detection regions corresponding to ranging data within a specified range are adjacent, performing focus adjustment based on ranging data of the plurality of adjacent focus detection regions.

17. A non-transitory computer-readable medium storing processor executable code, which when executed by at least one processor, causes the at least one processor to perform a focus adjustment method, the processor being arranged within a focus control device that has an image sensor capable of generating a phase difference detection signal by receiving light flux that has passed through a photographing lens, and executes focus adjustment based on the phase difference detection signal, the focus adjustment method comprising:
detecting ranging data representing defocus amount based on phase difference detection signals of a plurality of focus detection regions that have been set in a region of the image sensor where the light flux is received;
arranging ranging data corresponding to the plurality of focus detection regions in order of short distance; and performing focus adjustment based on remaining ranging data after having excluded ranging data within a specified range from ranging data representing closest range; and
as the specified range, setting a number of ranging data, or setting a specified defocus amount range, based on number or size of the focus detection regions.

* * * * *